United States Patent
Noda et al.

(10) Patent No.: US 7,801,000 B2
(45) Date of Patent: Sep. 21, 2010

(54) RECORDING/READING METHOD FOR AN OPTICAL RECORDING MEDIUM USING AN IRRADIATING A LASER BEAM

(75) Inventors: Yoshihiro Noda, Tokyo (JP); Hideyuki Kubo, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 80 days.

(21) Appl. No.: 11/854,773

(22) Filed: Sep. 13, 2007

(65) Prior Publication Data

US 2008/0002550 A1 Jan. 3, 2008

Related U.S. Application Data

(63) Continuation of application No. 11/135,756, filed on May 24, 2005, and a continuation of application No. PCT/JP03/15983, filed on Dec. 12, 2003.

(30) Foreign Application Priority Data

| Dec. 17, 2002 | (JP) | ............................. 2002-365541 |
| Dec. 17, 2002 | (JP) | ............................. 2002-365542 |
| Aug. 20, 2003 | (JP) | ............................. 2003-295988 |

(51) Int. Cl.
*G11B 7/00* (2006.01)
(52) U.S. Cl. .............. 369/47.55; 369/44.26; 369/59.26; 369/94
(58) Field of Classification Search ....................... None
See application file for complete search history.

(56) References Cited

U.S. PATENT DOCUMENTS

| 5,745,467 A | 4/1998 | Sakaue et al. |
| 5,764,619 A | 6/1998 | Nishiuchi et al. |
| 5,881,032 A * | 3/1999 | Ito et al. .................... 369/30.1 |
| 6,002,655 A * | 12/1999 | Ono et al. ................ 369/44.27 |
| 6,072,759 A * | 6/2000 | Maeda et al. ............ 369/59.25 |

(Continued)

FOREIGN PATENT DOCUMENTS

EP 0715301 6/1996

(Continued)

OTHER PUBLICATIONS

Notification of Reasons for Rejection dated Aug. 19, 2008, from corresponding Japanese Application No. 2006-120397.

(Continued)

*Primary Examiner*—Wayne R Young
*Assistant Examiner*—Adam R Giesy
(74) *Attorney, Agent, or Firm*—Katten Muchin Rosenman LLP

(57) ABSTRACT

In an optical recording medium of a single-sided incident type having a plurality of recording layers, recording/reading conditions (for example, tracking polarity, recording pulse strategy, recording recommended power, etc.) can be instantaneously switched according to each of the recording layer, and recording or reading of information can be accurately and surely performed under recording/reading conditions adapted to each recording layer. A control unit reads out layer information from one recording layer of the optical recording medium in which the layer information is recorded in each of the plural layers, on which recording or reading of information can be performed by irradiating a laser beam from one side thereof (layer information reading step), and controls so that recording or reading is performed under recording/reading conditions adapted to a recording layer specified on the basis of the layer information (recording controlling step).

12 Claims, 6 Drawing Sheets

U.S. PATENT DOCUMENTS

| | | |
|---|---|---|
| 6,345,026 B1 | 2/2002 | Furukawa et al. |
| 6,404,712 B1 * | 6/2002 | Lee et al. ................ 369/47.53 |
| 6,424,614 B1 | 7/2002 | Kawamura et al. |
| 2002/0150717 A1 | 10/2002 | Maeda |
| 2003/0058771 A1 | 3/2003 | Furukawa et al. |
| 2003/0202436 A1 * | 10/2003 | Tomita et al. ............ 369/44.26 |

FOREIGN PATENT DOCUMENTS

| | | |
|---|---|---|
| EP | 1 111 604 | 6/2001 |
| EP | 1 260 980 | 11/2002 |
| EP | 1 271 491 | 1/2003 |
| EP | 1 300 836 | 4/2003 |
| EP | 1 331 631 | 7/2003 |
| JP | 3-157816 | 7/1991 |
| JP | 8-147762 | 6/1996 |
| JP | 8-212561 | 8/1996 |
| JP | 10-505188 | 5/1998 |
| JP | 11-66576 | 3/1999 |
| JP | 11-66622 | 3/1999 |
| JP | 2000-503446 | 3/2000 |
| JP | 2001-167453 | 6/2001 |
| JP | 2003288759 | 10/2003 |
| JP | 2004-199757 | 7/2004 |
| JP | 2006-236574 | 9/2006 |
| WO | 97/15050 | 4/1997 |
| WO | 02/29791 | 4/2002 |

OTHER PUBLICATIONS

Notification of Reasons for Rejection dated Aug. 19, 2008, from corresponding Japanese Application No. 2002-365541.
Notification of Reasons for Rejection dated Aug. 19, 2008, from corresponding Japanese Application No. 2003-295988.
Supplementary European Search Report dated Oct. 21, 2008, from the corresponding European Application.
Notification of Examination mailed May 25, 2007, from the corresponding Taiwanese Application.
Notification of Reasons for Rejection dated Apr. 13, 2010 from corresponding Japanese Application No. 2009-00790.
Non-final Office Action dated Jan. 16, 2007 from corresponding U.S. Appl. No. 11/135,756.
Non-final Office Action dated Feb. 9, 2007 from corresponding U.S. Appl. No. 11/135,756.
Final Office Action dated Jul. 18, 2007 from corresponding U.S. Appl. No. 11/135,756.
Non-final Office Action dated Jan. 18, 2008 from corresponding U.S. Appl. No. 11/135,756.
Final Office Action dated Sep. 8, 2008 from corresponding U.S. Appl. No. 11/135,756.
Non-final Office Action dated Mar. 30, 2009 from corresponding U.S. Appl. No. 11/135,756.
Final Office Action dated Nov. 24, 2009 from corresponding U.S. Appl. No. 11/135,756.

* cited by examiner

RECORDING/READING METHOD FOR AN OPTICAL RECORDING MEDIUM USING AN IRRADIATING A LASER BEAM

TECHNICAL FIELD

The present invention relates to an optical recording medium having a plurality of recording layers, on which recording and reading of information can be performed by irradiating a laser beam from one side thereof, such as DVD-R or the like, and a recording/reading method and a recording/reading apparatus for the optical recording medium.

BACKGROUND ART

Various types of optical recording media such as CD-R, CD-RW, MO and so forth are widely recognized and spread as external storages for information processing apparatuses such as computers because they can store a large volume of information and can be randomly accessed easily. With an increase in quantity of handled information, there is a demand to increase the recording density.

Among various optical recording media, optical recording media (optical disks) having a recording layer containing an organic dye (also referred to as a dye containing recording layer) such as CD-R, DVD-R, DVD+R and the like are particularly widely used because they are relatively inexpensive and have compatibility with read-only optical disks.

Media such as CD-R representative of optical disks having the dye containing recording layer, for example, are in a laminated structure which has a dye containing recording layer and a reflective layer in order on a transparent disk substrate along with a protective layer for covering the dye containing layer and the protective layer. Recording and reading are performed with a laser beam through the substrate.

DVD-R, which is representative as well, has a laminated structure in which a dye containing recording layer, a reflective layer and a protective layer covering them are formed in this order on a first transparent disk substrate, and a so-called dummy disk, which is a second disk substrate (which may be transparent or opaque) and a reflective layer formed on the second disk substrate is formed on the protective layer through or not through an adhesive layer. Recording and reading are performed with a laser beam from one side of the disk through the first transparent disk substrate. The dummy disk may be of only a transparent or opaque disk substrate, or may be provided with a layer other than the reflective layer. Meanwhile, DVD+R has almost the same structure as DVD-R, description of which will be hereinafter represented by DVD-R.

In order to largely increase the recording capacity of the optical recording medium, two single-sided DVD-Rs as above are bonded together to form a medium having two recording layers, which is known as a double-sided DVD-R (double-sided, dual-layer DVD-R). Recording and reading are performed by irradiating a laser beam onto each of the recording layers from the both sides (that is, the laser beam is irradiated from one side of the medium to perform recording and reading on a recording layer closer to this side, while the laser beam is irradiated from the other side of the medium to perform recording and reading on the other recording layer closer to the other side).

Other than the above, widely known is an optical recording medium (optical disk) having a phase-change recording layer such as CD-RW, DVD-RW or the like. A rewritable optical recording medium having a phase-change recording layer has generally protective layers on and under the recording layer.

With respect to optical recording media having a plurality of recording layers, there is, in these years, a demand for a single-sided incident type optical recording medium (for example, single-sided incident type DVD-R) on which recording and reading can be performed on a plurality of recording layers by irradiating a laser beam from one side so as to avoid an increase in size and complexity of the recording/reading apparatus, and enable continuous reading from the plural recording layers.

To meet the above demand, there has been proposed a single-sided incident type DVD-R of the dual-layer type having two recording layers, for example, as the single-sided incident type optical recording medium having the structure below (refer to Japanese Unexamined Patent Publication No. HEI 11-66622, for example).

For example, a single-sided incident type DVD-R of the dual layer type is formed by laminating, on a first light-transmissible substrate, a first recording layer made from an organic dye on which information can be optically recorded by irradiating a laser beam for recording, a first reflective layer made of a semi-light-transmissible reflective film that can pass through a part of the laser beam for reading, an intermediate layer that can pass through the laser beam for recording and the laser beam for reading, a second recording layer made from an organic dye on which information can be optically recorded by irradiating the laser beam for recording, a second reflective layer reflecting the laser beam for reading, and a second light-transmissible substrate in this order.

In the single-sided incident type optical recording medium having a plurality of recording layers such as a dual-layer, single-sided incident type DVD-R or the like, the optimum recording/reading conditions such as recording pulse strategy (recording strategy, write strategy), recording power, reading power, etc. largely differ depending on each recording layer.

For this, it is desirable that a recording/reading apparatus which performs recording or reading of information on each of the recording layers of a single-sided incident type optical recording medium having a plurality of recording layers can switch the recording/reading conditions such as recording pulse strategy, recording power, reading power, etc., for example, thereby to accurately and surely perform recording or reading of information.

In order to allow the recording/reading apparatus to randomly access to each of the recording layers of the optical recoding medium to record or read information, it is necessary that the recording/reading conditions are instantaneously switched according to the recording layer, in particular.

There is an idea that address information is continuously given to a plurality of recording layers, and the recording/reading apparatus determines which recording layer the relevant layer is on the basis of read address information, for example. However, such manner still has difficulty in instantaneously telling which recording layer the relevant recording layer is.

DISCLOSURE OF INVENTION

In the light of the above problem, an object of the present invention is to provide an optical recording medium, a recording/reading method for the optical recording medium, and a recording/reading apparatus for the optical recording medium, wherein recording/reading conditions such as recording pulse strategy, recording power, reading power, and so forth can be switched instantaneously according to a recording layer to be recorded information thereon or to be read information therefrom in an optical recording medium in which recording or reading of information is performed on a plurality of recording layers by irradiating a laser beam from one side thereof.

Another object of the present invention is to accurately and surely record or read information under recording/reading conditions (for example, tracking polarity, recording pulse strategy, recording power, reading power, etc.) adapted to a recording layer to be recorded information thereon or to be read information therefrom in an optical recording medium in which recording or reading of information is performed on a plurality of recording layers by irradiating a laser beam from one side thereof.

A recording/reading method for an optical recording medium according to this invention comprising a layer information reading step of reading, by means of a control unit, layer information from one recording layer of an optical recording medium, in which the layer information is recorded on each of a plurality of recording layers which can be recorded information thereon or can be read information therefrom by irradiating a laser beam from one side thereof, and a recording controlling step of controlling, by means of the control unit, so that recording or reading is performed under recording/reading conditions adapted to a recording layer specified on the basis of the layer information.

Preferably, the method further comprises a recording/reading conditions reading step of reading, by means of the control unit, recording/reading conditions for each of the recording layers recorded in the optical recording medium.

A recording/reading apparatus for an optical recording medium according to this invention comprises a layer information reading unit for reading layer information from one recording layer of an optical recording medium, in which the layer information is recorded on each of a plurality of recording layers which can be recorded information thereon or can be read information therefrom by irradiating a laser beam from one side thereof, and a recording/reading controlling unit for controlling so that recording or reading is performed under recording/reading conditions adapted to a recording layer specified on the basis of the layer information.

Preferably, the apparatus further comprises a recording/reading conditions reading unit for reading recording/reading conditions for each of the recording layers recorded in the optical recording medium.

An optical recording medium according to this invention, on which recording or reading is performed in the recording/reading method for an optical recording medium according to claim 1, comprises a plurality of recording layers which can be recorded information thereon or can be read information therefrom by irradiating a laser beam from one side thereof, each of the recording layers on which the layer information is recorded.

Preferably, the layer information is recorded on almost the entire surface of each of the recording layers. Particularly, it is preferable that the layer information is recorded as a part of address information.

Preferably, the layer information is recorded by making values of reserved bits included in address information of the recording layers differ from one another.

Further, it is preferable that the layer information is recorded by reversing a sync pattern included in address information of either one of neighboring two recording layers among the plural recording layers.

Still further, it is preferable that the layer information is recorded in any one of manners of inverting the most significant bit of address information of either one of two neighboring recording layers among the plural recording layers, inverting all bits of the whole address information of one recording layer, and expressing the whole address information of one recording layer by two's complement.

It is preferable that the optical recording medium has two recording layers as the plural recording layers.

It is further preferable that at least one of the recording/reading conditions for each of the recording layers is recorded.

The recording/reading conditions include tracking information.

It is preferable that the recording/reading conditions include a recording pulse strategy and/or a recording recommended power.

Further, it is preferable that the recording/reading conditions are recorded on a layer closest to the side from which a laser beam comes in among the recording layers.

Preferably, each of the recording layers is a dye containing recording layer.

The optical recording medium, the recording/reading method for the optical recording medium and the recording/reading apparatus for the optical recording medium according to this invention offer an advantage that the recording/reading conditions such as recording pulse strategy, recording power, reading power, and so forth can be instantaneously switched according to a recording layer to be recorded information thereon or read information therefrom.

The present invention offers another advantage that recording or reading of information can be accurately and surely performed under recording/reading conditions (for example, tracking polarity, recording pulse strategy, recording power, reading power, etc.) adapted to a recording layer to be recorded information thereon or to be read information therefrom.

BEST MODE FOR CARRYING OUT THE INVENTION

Hereinafter, description will be made of an optical recording medium (write-once optical recording medium), a recording/reading method and a recording/reading apparatus for the optical recording medium according to an embodiment of this invention with reference to FIGS. 1 through 6.

An optical recording medium according to this embodiment is a single-sided incident type optical recording medium having a plurality of recording layers, on which recording or reading of information can be performed by irradiating light (laser beam) from one side thereof.

In this embodiment, description will be made, taking a dual-layer DVD-R (write-once optical recording medium) of a single-sided incident type having, for example, two recording layers as an example of the single-sided incident type optical recording medium (single-sided incident type DVD-R)

(1) Structure of Optical Recording Medium

First, description will be made of two types of optical recording media (optical disks) having different laminated structures as the optical recording media according to this embodiment.

(A) Type 1

Figure 1:
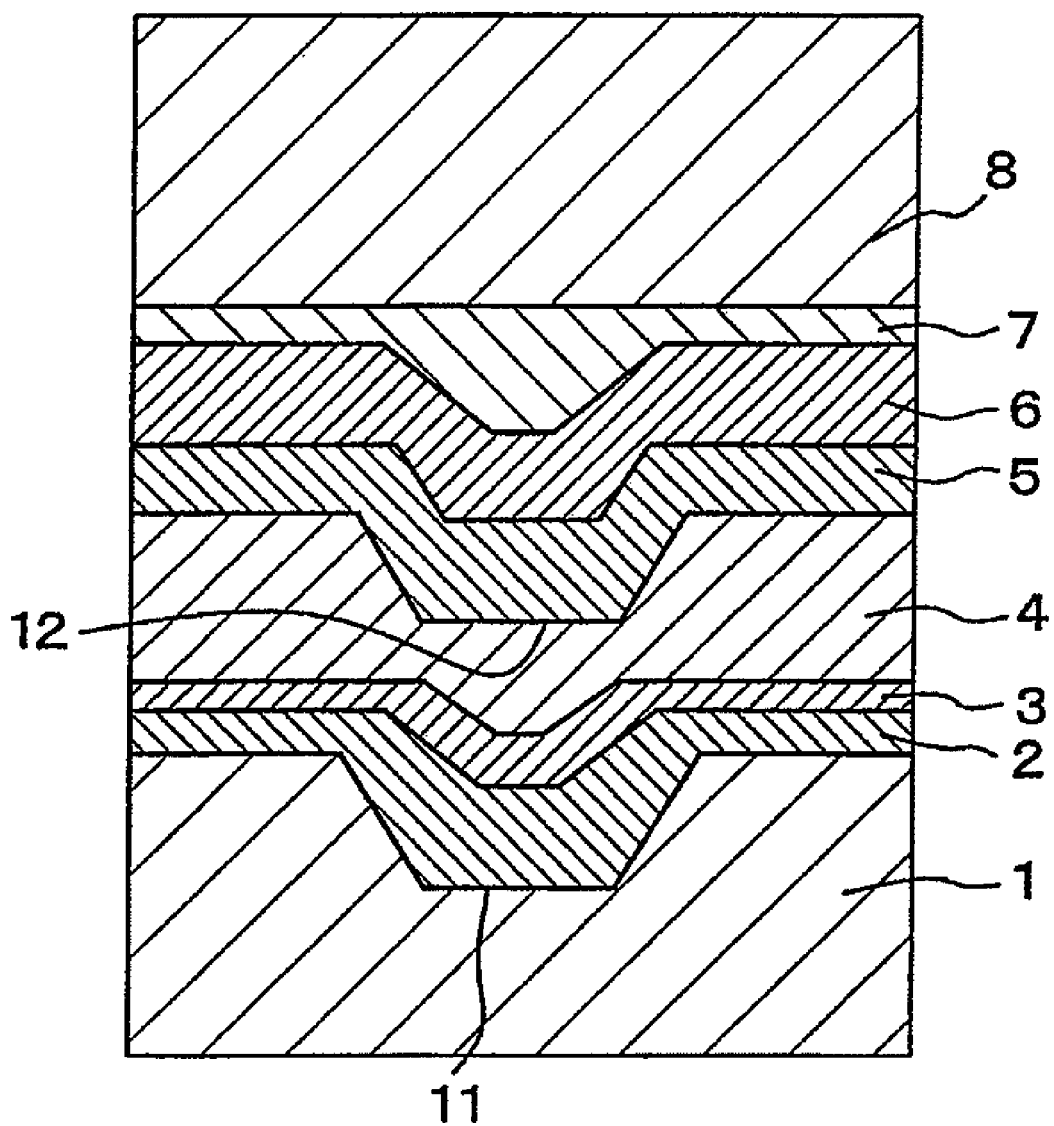
FIG. 1 is a diagram typically showing the whole structure of an optical recording medium (of type 1) according to an embodiment of this invention.

FIG. 1 is a sectional view typically showing an optical recording medium (of type 1; single-sided incident type optical recording medium of the laminated type) according to this embodiment.

The optical recording medium of the type 1 according to this embodiment has a first recording layer (first recording layer, first dye containing recording layer) 2 containing a dye, a semitransparent first reflective layer (hereinafter referred to as a semitransparent reflective layer) 3, an intermediate resin layer (intermediate layer) 4, a second recording layer (second recording layer, second dye containing recording layer) 5 containing a dye, a second reflective layer 6, an adhesive layer 7 and a second substrate (second substrate) 8 in this order on a disk-shaped transparent (light-transmissible) first substrate (first substrate, first light-transmissible substrate) 1. Optical beams (laser beams) are irradiated from the side of the first substrate 1 to perform recording or reading.

In this embodiment, "transparent (light-transmissible)" signifies "transparent (light-transmissible) to optical beams used for recording on or reading from the optical recording medium." Transparent (light-transmissible) layers include a layer which absorbs more or less the optical beams used for recording or reading. For example, when the layer has a transmittance of not less than 50 percent, preferably not less than 60 percent to the wavelength of an optical beam used for recording or reading, the layer is considered to be practically light-transmissible (transparent).

Concavities and convexities (lands and grooves) are formed on the transparent first substrate 1 and the intermediate resin layer 4. Recording tracks are formed with a concave portion and/or a convex portion. Here, a recording track 11 on the transparent first substrate 1 is formed with a groove (portion) of the first substrate 1, that is, the convexity (portion) with respect to the direction of the incident light. A recording track 12 on the intermediate resin layer 4 is formed with a groove (portion) of the intermediate resin layer 4, that is, the convex portion with respect to the direction of the incident light. Incidentally, the recording tracks 11 and 12 may be formed with the concavities with respect to the direction of the incident light, or may be formed with both the concavity and convexity with respect to the direction of the incident light. Generally, it is preferable that the recording track is formed with a convex portion with respect to the direction of the incident light. In this invention, the concavity and convexity are defined with respect to the direction of incident light beams used for recording or reading unless not specifically mentioned.

These recording tracks 11 and 12 are made slightly snake in the radial direction at predetermined amplitude and frequency (this called "wobble"). Isolated pits (address pits) are formed according to a certain rule on the land adjacent to the track 11 or the track 12, for example (this called "Land Pre-Pit"; LPP). Address information is beforehand recorded with the Land Pre-Pit. Such Pre-Pit may be formed for other information. It is also possible to reverse the direction of the wobble or modulate the frequency, thereby to record such information.

Next, each of the layers will be described.

(a) With Respect To First Substrate 1

It is desirable that the first substrate 1 has excellent optical characteristics, that is, the first substrate 1 is transparent, has small birefringence, and so force. It is also desirable that the first substrate 1 has excellent molding properties, that is, the first substrate 1 can be readily formed in injection molding. When the first substrate 1 has small hygroscopicity, such property is desirable because the warping (tilt) of the substrate can be decreased and the good mechanical characteristics can be achieved.

Further, it is desirable that the first substrate 1 has shape stability so that the optical recording medium has some degree of rigidity. When the second substrate 8 has sufficient shape stability, the first substrate 1 is not required to have large shape stability.

As such material, it is possible to use resins such as acrylic resins, methacrylic resins, polycarbonate resin, polyolefin resins (particularly, amorphous polyolefin), polyester resins, polystyrene resin, epoxy resin, and so forth, and glass. The first substrate 1 may be comprised of a plurality of layers. It is possible to provide a resin layer made from a radiation-setting resin such as a UV curing resin or the like on the substrate made from glass, resin, or the like. Incidentally, "radiation" is a general term for light (ultraviolet radiation, visible radiation, infrared ray, etc.), electron beams, and the like.

Meanwhile, polycarbonate is preferable from the viewpoint of optical properties, high productivity such as molding properties and the like, cost, low hygroscopicity, shape stability, etc. From the viewpoint of chemical resistance, low hygroscopicity and the like, amorphous polyolefin is preferable. From the viewpoint of high-speed responsibility and the like, a glass substrate is preferable.

The first substrate 1 is preferably thin. It is preferable that the first substrate 1 has a thickness of 2 mm or less, more preferably 1 mm or less. The smaller the distance between the objective lens and the recording layer and the thinner the substrate, the smaller is coma aberration, which is advantageous to increase the recording density. To obtain sufficient optical properties, hygroscopicity, molding properties and shape stability, some degree of thickness is required. It is thus preferable that the thickness of the first substrate 1 is generally 10 μm or more, more preferably 30 μm or more.

In order to well perform recording and reading on both of the first recording layer 2 and the second recording layer 5 in this optical recording medium, it is desirable to suitably adjust the distance between the objective lens and the both recording layers. For example, it is preferable to set the focus of the objective lens at an almost intermediate point between the both recording layers because accesses to the both layers become easy.

More concretely, in DVD-ROM and DVD-R system, the distance between the objective lens and the recording layer is adjusted to be most suitable when the thickness of the substrate is 0.6 mm.

When this layer structure is compatible with DVD-ROM, it is most preferable that the first substrate 1 has a thickness obtained by subtracting a half of the film thickness of the intermediate resin layer 4 from 0.6 mm. If so, the approximately intermediate point between the both layers is approximately 0.6 mm, thus the focusing servo control can be readily performed on the both recording layers.

When another layer such as a buffer layer, a protective layer or the like exists between the second recording layer 5 and the first reflective layer 3, it is most preferable that the first substrate 1 has a thickness obtained by subtracting a half of a sum of the thicknesses of that layer and the intermediate resin layer 4 from 0.6 mm.

Concavities and convexities are formed spirally or concentrically on the first substrate 1 to form grooves and lands. Generally, with such grooves and lands as being recording tracks, information is recorded on and read from the first recording layer 2. In the case of a so-called DVD-R disk on which recording and reading are performed by condensing a laser beam having a wavelength of 650 nm with an objective lens having a numerical aperture of 0.6 to 0.65, the first recording layer 2 is generally formed in spin coating, so that the film of the first recording layer 2 is thick at the grooves, which is suitable for recording and reading.

In this optical recording medium, it is preferable that the groove of the first substrate 1, that is, the convexity with respect to the direction of the incident light beam, is used as the recording track 11. Here, the concavity and the convexity are portions recessed and projecting in relation with the direction of the incident light beam. Generally, the width of the groove is about 50 to 500 nm, and the depth of the groove is about 10 to 250 nm. When the recording track is spiral, the track pitch is preferably about 0.1 to 2.0 µm. The first substrate 1 may have concave or convex pits such as Land Pre-Pit or the like as required.

From the viewpoint of cost, it is preferable to manufacture the substrate having such concavities and convexities in injection molding from a stamper having concavities and convexities. When a resin layer made from a radiation-setting resin such as a UV curing resin or the like is formed on the substrate made from glass or the like, a concavity or a convexity such as a recording track or the like may be formed on the resin layer.

(b) With Respect to First Recording Layer 2

Generally, the sensitivity of the first recording layer 2 is almost equivalent to that of the recording layer used in a single-sided recording medium ("single-sided" means, for example, CD-R, DVD-R, DVD+R or the like).

In order to realize a good recording/reading performance, it is preferable that the first recording layer 2 contains a low-exothermic dye having high refractive index.

Further, a combination of the first recording layer 2 and the first reflective layer 3 is preferably within appropriate ranges of the reflection, transmission and absorption of light, whereby the recording sensitivity is improved and the thermal interference during recording is decreased.

As such organic dye material, there are macrocyclic azaannulene type dyes (phtalocyanine dye, naphtalocyanine dye, porphyrin dye, etc.), pyrromethene type dyes, polymethine type dyes (cyanine dye, merocyanine dye, squalirium dye, etc.) anthoraquinone type dyes, azulenium type dyes, metal complex azo type dyes, metal complex indoaniline type dyes, etc.

Among the above various organic dyes, metal complex azo type dyes are preferable because they have excellent recording sensitivity, durability and light resistance. Particularly, a compound represented by the following general formula (I) or (II) is preferable:

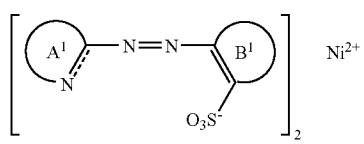
(I)

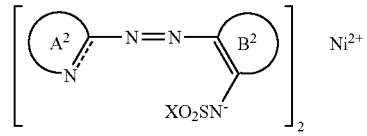
(II)

(where rings $A^1$ and $A^2$ are nitrogen-containing aromatic heterocycles, each of which can independently have a substituent; rings $B^1$ and $B^2$ are aromatic rings, each of which can independently have a substituent; and X is an alkyl group having carbon number 1 to 6 substituted with at least two fluorine atoms).

An organic dye used in the recording layer of this optical recording medium is preferably a dye compound having the maximum absorption wavelength λ max within a range from the visible rays to the near infrared rays of approximately 350 to 900 nm, and suited to recording with a laser of blue to near microwave. More preferable is a dye suited to recording with a near infrared laser having a wavelength of about 770 to 830 nm (typically at 780 nm, 830 nm, etc.) used generally for CD-R having a wavelength of about 620 to 690 nm, a red laser (typically at 635 nm, 650 nm, 680 nm, etc.) used for DVD-R, or a so-called blue laser having a wavelength of 410 nm or 515 nm.

It is possible to use one kind of dye, or mix two or more the same or different kinds of dyes and use them. Further, it is possible to use together dyes suited for recording with a recording beam at a plurality of wavelengths to realize an optical recording medium coping with recording with a laser beam in a plurality of wavelength bands.

The recording layer may contain a transition metal chelate compound (for example, acetylacetonato chelate, bisphenyldithiol, salicylaldehyde oxime, bisdithio-α-diketone or the like) as a singlet oxygen quencher in order to stabilize the recording layer or improve the light resistance, or a recording sensitivity improving agent such as a metal system compound or the like in order to improve the recording sensitivity. Here, the metal system compound is that a metal such as a transition metal or the like in the form of atom, ion, cluster or the like is contained in a compound. As such metal system compound, there are, for example, organometallic compounds such as ethylenediamine complexes, azomethine complexes, phenylhydroxyamine complexes, phenanthroline complexes, dihydroxyazobenzene complexes, dioxime complexes, nitrosoaminophenol complexes, phyridyltriazine complexes, acetylacetonato complexes, metallocene complexes, porphyrin complexes, and the like. There is no limitation with respect to the metal atom, but a transition metal is preferable.

Further, a binder, a leveling agent, an antiforming agent and the like may be together used to make the recording layer of this optical recording medium as required. As a preferable binder, there are polyvinyl alcohol, polyvinyl pyrrolidone, nitrocellulose, cellulose acetate, ketone resins, acrylic resins, polystyrene resins, urethane resins, polyvinyl butyral, polycarbonate, polyolefin, etc.

The film thickness of the recording layer is not specifically limited because the suited film thickness differs according to the recording method or the like. However, in order to obtain sufficient modulation amplitude, the film thickness is preferably 5 nm or more, more preferably 10 nm or more, and specifically preferably 20 nm or more, in general. However, the recording layer is required not to be excessively thick in order to appropriately pass through the light in this optical recording medium. Accordingly, the film thickness of the recording layer is generally 3 µm or less, preferably 1 µm or less, and more preferably 200 nm or less. The film thickness of the recording layer differs from the groove to the land. In this optical recording medium, the film thickness of the recording layer is at the groove of the substrate.

As the method of making of the recording layer, there can be applied a thin film deposition generally performed such as vacuum evaporation, sputtering method, doctor blade method, cast method, spin coating, dipping method or the like. From the standpoint of productivity and cost, spin coating is preferable. Vacuum evaporation is more preferable than coating method because it can yield a recording layer having uniformity in the film thickness.

In case that the recording layer is made by spin coated, the rotation speed is preferably 10 to 15000 rmp. After the spin coating, a process of annealing or applying solvent vapor or the like may be performed.

As a coating solvent used when the recording layer is formed in a coating method such as doctor blade method, cast method, spin coating, dipping method or the like, the type of solvent is not limited, thus any solvent can be used so long as it does not attack the substrate. For example, there are ketone alcohol type solvents such as diaceton alcohol, 3-hydroxy-3-methyl-2-butanone and the like, cellosolve type solvents such as methyl cellosolve, ethyl cellosolve and the like, chain hydrocarbon type solvents such as n-hexane, n-octane and the like, ring hydrocarbon type solvents such as cyclohexane, methylcyclohexane, ethylcyclohexane, dimethylcyclohexane, n-butylcyclohexane, tert-butylcyclohexane, cyclooctane and the like, perfluoroalkylalcohol type solvents such as tetrafluoropropanol, octafluoropentanol, hexafluorobutanol and the like, hydroxy carboxylic acid ester type solvents such as methyl lactate, ethyl lactate, methyl 2-hydroxyisobutyric acid and the like, etc.

In the case of vacuum evaporation, organic dyes are put in a crucible disposed inside a vacuum chamber, along with dyes with such as various additives and the like as required, for example, the inside of the vacuum chamber is evacuated to about $10^{-2}$ to $10^{-5}$ Pa by an appropriate vacuum pump, after that, the crucible is heated to vaporize dyes and other additives, and the recording layer components are deposited on the substrate placed opposite to the crucible, whereby the recording layer is formed.

(c) With Respect to First Reflective Layer 3

The first reflective layer 3 is a reflective layer having some degree of light transmittance. Namely, the first reflective layer 3 is a reflective layer which has small absorption (absorption of recording/reading beam), a light transmittance of not less than 40 percent, and appropriate light reflectance (of not less than 30 percent, in general). For example, by providing a thin metal film having high reflectance, it is possible to give appropriate transmittance. It is desirable that the first reflective layer 3 have some degree of corrosion resistance. Further, it is desirable that the semitransparent reflective layer 3 has shutting-off properties so that the first recording layer 2 is not affected by seeping of the upper layer (here the intermediate resin layer 4) of the first reflective layer 3.

To secure high transmittance, the thickness of the first reflective layer 3 is preferably 50 nm or less, in general. The thickness of the first reflective layer 3 is more preferably 30 nm or less, and still more preferably 25 nm or less. However, the first reflective layer 3 is required to be thick to some degree in order to avoid an effect of the upper layer of the first reflective layer 3 on the first recording layer 2. Thus, the thickness of the first reflective layer 3 is generally 3 nm or more, and more preferably 5 nm or more.

As the material of the first reflective layer 3, it is possible to use, in the pure metal or in the form of alloy, metals and semimetals such as Au, Al, Ag, Cu, Ti, Cr, Ni, Pt, Ta, Pd, Mg, Se, Hf, V, Nb, Ru, W, Mn, Re, Fe, Co, Rh, Ir, Zn, Cd, Ga, In, Si, Ge, Te, Pb, Po, Sn, Bi and rare earth metals, which have appropriately high reflectance at the wavelength of the reading beam. Among them, Au, Al and Ag have high reflectance, thus are suitable as the material of the first reflective layer 3. The semitransparent reflective layer 3 may contain other component other than the above as being the main component.

A material containing Ag as the main component is particularly preferable because of its low cost and high reflectance. Here, the main component signifies a material contained not less than 50 percent.

Since the first reflective layer 3 has thin film thickness, large crystal grains of the film cause reading noise. Thus, it is preferable to use a material having small crystal grains. Since pure silver tends to have large crystal grains, it is preferable to use Ag as in the form of alloy.

Particularly, it is preferable to contain Ag as the main component, and 0.1 to 15 atomic percent of at least one element selected from the group consisting of Ti, Zn, Cu, Pd, Au and rare earth metals. When two or more of Ti, Zn, Cu, Pd, Au and rare earth metals are contained, each of these may be 0.1 to 15 atomic percent. However, the sum of these is preferably 0.1 to 15 atomic percent.

A particularly preferable alloy composition is one that contains Ag as the main component, 0.1 to 15 atomic percent of at least one element selected from the group consisting of Ti, Zn, Cu, Pd and Au, and 0.1 to 15 atomic percent of at least one rare earth element. Among the rare earth metals, neodymium is particularly preferable. In more concrete, AgPdCu, AgCuAu, AgCuAuNd, AgCuNd, etc. are preferable.

As the first reflective layer 3, a layer made from only Au is preferable because it has small crystal grains and corrosion resistance, but it is more expensive than an Ag alloy.

Alternatively, it is possible to use a layer made from Si as the first reflective layer 3.

It is possible to stack, one after the other, a thin film having low reflectance and a thin film having high reflectance both made from materials other than metals to form multi-layers, and use them as the reflective layer.

As a method for forming the first reflective layer 3, there can be applied, for example, sputtering, ion plating, chemical evaporation, vacuum evaporation, etc. It is possible to provide an inorganic or organic intermediate layer and an adhesive layer between the first substrate 1 and the first recording layer 3 in order to improve the reflectance, the recording performance and the adhesive properties. For example, it is possible that an intermediate layer (or an adhesive layer), the first recording layer 2, and an intermediate layer (or an adhesive layer) and the first reflective layer 3 are stacked in this order on the first substrate 1 to provide the intermediate layer (or the adhesive layer) between the first substrate 1 and the first recording layer 2, and to provide the intermediate layer (or the adhesive layer) between the first recording layer 2 and the first reflective layer 3.

(d) With Respect To Intermediate Resin Layer 4

The intermediate resin layer 4 is required to be transparent, and to allow grooves and pits to be formed thereon with concavities and convexities. It is preferable that the intermediate resin layer 4 has strong adhesion, and small shrinkage factor at the time that the intermediate resin layer 4 hardens and adheres, which gives higher stability to the shape of the medium.

It is desirable that the intermediate resin layer 4 is made from a material that does not damage the second recording layer 5. The intermediate resin layer 4 and the second recording layer 5 are soluble into each other in ordinary cases because the intermediate resin layer 4 is generally made from a resin which is soluble the dye materials of the second recording layer 5. For this, it is desirable to provide a buffer layer to be described later between the both layers in order to prevent the intermediate resin layer 4 from dissolving the second recording layer 5 and from giving damage thereto.

Further, it is desirable that the intermediate resin layer 4 is made from a material that does not damage the first reflective layer 3. It is possible to provide a buffer layer to be described later between the both layers in order to avoid the damage.

In this optical recording medium, it is preferable to accurately control the film thickness of the intermediate resin layer 4. The film thickness of the intermediate resin layer 4 is preferably 5 μm or more, in general. It is necessary to provide a certain degree of distance between the two recording layers in order to perform the focusing servo control separately on the two recording layers. The film thickness of the intermediate resin layer 4 is required to be generally 5 μm or more, and preferably 10 μm or more although it depends on the focusing servo mechanism. Generally, the distance between the two recording layers can be smaller as the objective lens has a larger numerical aperture. However, when the intermediate resin layer 4 is excessively thick, it takes a long time to adjust the focusing servo to the two recording layers and the objective lens has to be moved for a long distance, which is thus undesirable. Further, an excessively thick layer requires a long time to harden, which leads to a decrease in productivity. Accordingly, the film thickness of the intermediate resin layer 5 is preferably 100 μm or less.

Spiral or concentric concavities and convexities are formed on the intermediate resin layer 4 to form grooves and lands. Generally, such grooves and lands are used as recording tracks to record or read information in or from the second recording layer 5. Since the second recording layer 5 is formed in coating, the film thereof is thick at the groove, thus suits for recording and reading. In this optical recording medium, it is preferable to use the groove of the intermediate resin layer 4, that is, the convex portion to the direction of the incident light beam, as the recording track 12. Here, the concave portion and the convex portion are a concave portion and a convex portion with respect to the direction of the incident light beam. Generally, the width of the groove is about 50 to 500 nm, and the depth of the same is about 10 to 250 nm. When the recording track is spiral, the track pitch is preferably about 0.1 to 2.0 μm. Concave or convex pits such as Land Pre-Pit may be formed as required.

It is preferable from the viewpoint of the cost that such concavities and convexities are manufactured by transferring the concavities and convexities from a resin stamper or the like having the concavities and convexities to a setting resin such as a photo-setting resin, and other kind of resins. Hereinafter, such method will be occasionally referred to as 2P method (Photo Polymerization method).

As the material of the intermediate resin layer 4, available are thermoplastic resins, thermosetting resins, electron beam setting resins, ultraviolet ray curing resins (including retarded setting type), etc., for example.

The intermediate resin layer 4 can be formed by dissolving a thermoplastic resin, thermosetting resin or the like in an appropriate solvent to prepare a coating solution, applying the solution, and drying (heating) the solution. In the case of a ultraviolet curing resin, the intermediate resin layer 4 can be formed by dissolving the resin as it is or dissolving the resin in an appropriate solvent to prepare a coating solution, coating the coating solution, and radiating ultraviolet rays to cure the resin. There are various types of ultraviolet ray curing resins. However, any one of them can be used so long as it is transparent. One of these materials can be used or some of them can be mixed together to be used. Not only single layer but also multiple layers are applicable.

As the coating method, a coating method such as spin coating, cast method or the like is applicable, like the recording layer. Among them, spin coating is preferable. A resin having high viscosity can be coated in screen printing or the like. Use of a ultraviolet ray curing resin that has low viscosity at a temperature of 20 to 40° C. is preferable because no solvent is necessary to coat the resin. It is preferable to prepare the resin so that the viscosity thereof is 20 to 4000 mPa·s.

As the ultraviolet ray curing adhesives, there are radical type ultraviolet ray curing adhesives and cation type ultraviolet ray curing adhesives, both of which are usable.

As the radical type ultraviolet curing adhesives, all the known compositions are available. A composition containing an ultraviolet ray curing compound and a photopolymerization initiator as essential ingredients is used. As the ultraviolet ray curing compound, monofunctional (meta)acrylate or multifunctional (meta)acrylate is available as a polymeric monomer ingredient. These can be used solely, or two or more kinds of them can be used together. In this invention, acrylate and metaacrylate will be together referred to as (meta)acrylate.

For example, the followings are the polymeric monomers that can be used for this optical recording medium. As monofunctional (meta) acrylate, there is, for example, (meta) acrylate or the like having, as the substituent, a group of methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone denaturated tetrahydrofurfuryl, isobornyl, dicyclopentanyl, dicyclopentenyl, dicyclopentenyloxyethyl, or the like.

As the multifunctional (meta)acrylates, there are di(meta) acrylates of 1,3-butylenegycol, 1,4-butanediol, 1,5-pentanediol, 3-methyl-1,5-pentanediol, 1,6-hexanediol, neopentyl glycol, 1,8-octanediol, 1,9-nonanediol, tricyrodecandimethanol, ethylene glycol, polyethylene glycol, propylene glycol, dipropylene glycol, tripropylene glycol, polypropylene glycol and the like, di(meta)acrylate of tris(2-hydroxyethyl)isocyanurate, di(meta)acrylate of diole obtained by adding 4 or more moles of ethylene oxide or propylene oxide to 1 mole of neopentyl glycol, di(meta)acrylate of diole obtained by 2 moles of ethylene oxide or propylene oxide to 1 mole of bisphenol A, di or tri (meta) acrylate of triol obtained by adding 3 or more moles of ethylene oxide or propylene oxide to trimethylolpropane, di (meta) acrylate of diol obtained by adding 4 or more moles of ethylene oxide or propylene oxide to 1 mole of bisphenol A, trimethylolpropanetri (meta)acrylate, pentaerythritoltri(meta)acrylate, poly (meta)acrylate of dipentaerythritol, ethylene oxide denaturated phospholic acid (meta)acrylate, ethylene oxide denaturated alkylated phospholic acid (meta)acrylate, etc.

One that can be used together with polymetic monomer is polyester (meta)acrylate, polyether (meta)acrylate, epoxy (meta)acrylate, urethane (meta)acrylate or the like, as polymeric oligomer.

As a photopolimerization initiator used for this optical recording medium, any one of the known initiators that can harden a used ultraviolet ray setting compound represented by polymeric oligomer and/or polymeric monomer can be used. As the optical polymerization initiator, the molecular fission type or the hydrogen abstraction type is suitable.

As such photopolymerization initiator, suitably used are bensoin isobutyl ether, 2,4-diethylthioxanthone, 2-isoproplythioxanthone, benzyl, 2,4,6-trimethylbenzoyldiphenylphosphineoxide, 2-benzyl-2-dimethylamino-1-(4-morpholinophenyl)-butane-1-one, bis(2,6-dimethoxybenzoyl)-2,4,4-trimethylpenthylphosphinoxide, etc. As the molecular fission type other than these, 1-hydroxycyclohexylphenylketone, benzoinethylether, benzyldimethylketal, 2-hydroxy-2-methyl-1-phenylpropane-1-one, 1-(4-isopropylphenyl)-2-hydroxy-2-methylpropane-1-one, 2-methyl-1-(4-methylthiophenyl)-2-morphorinopropane-1-one, and the like can be together used. Further, benzophenone, 4-phenylbenzophenon, isophthalphenone, 4-benzoyl-4'-methyl-diphenyl-sulfide or the like, which are photopolymerization initiator of the hydrogen abstraction type, can be together used.

As the sensitizer to the photopolymerization initiator, amine that does not cause the addition reaction with the above polymeric component, such as trimethylamine, methyldimethanolamine, triethanolamine, p-diethylaminoacetophenone, p-dimethylaminoethylbenzoate, p-dimethylaminoisoamylbenzoate, N,N-dimethylbenzylamine, 4,4'-bis(diethylamino)benzophenone or the like. It is preferable to select and use one of the above photopolymerization initiators and sensitizers which has excellent solubility to the ultraviolet ray curing compound and does not hinder the ultraviolet ray transmissivity.

As the cation type ultraviolet ray curing adhesive, all the known compositions can be used. Epoxy resins containing a photopolimerization initiator of the cation polymerization type correspond to this. As photo initiators of the cation polymerization type, there are sulfonium salts, iodonium salts, diazonium salts, etc.

As examples of iodonium salts, there are diphenyliodonium hexafluorophosphate, diphenyliodonium hexafluoroantimonate, diphenyliodonium tetrafluoroborate, diphenyliodonium tetrakis(pentafluorophenyl) borate, bis(dodecylphenyl)iodonium hexafluorophosphate, bis(dodecylphenyl)iodonium hexafluoroantimonate, bis(dodecyl)iodonium tetrafluoro borate, bis(dodecylphenyl)iodonium tetrakis(pentafluorophenyl)borate, 4-methylphenyl-4-(1-methylethyl)phenyliodonium hexafluorophosphate, 4-methylphenyl-4-(1-methylethyl)phenyliodonium hexafluoroantimonate, 4-methylphenyl-4-(1-methylethyl)phenyliodonium tetrafluoroborate, 4-methylphenyl-4-(1-methylethyl)phenyliodonium tetrakis(penthafluorophenyl)borate, etc.

As the epoxy resin, any one of bisphenol A-epichlorohydrin type, alicylic epoxy, long-chain aliphatic type, brominated epoxy resin, glycidyl ester type, glycidyl ether type, heterocyclic system, etc. is available.

As the epoxy resin, it is preferable to use one that has small contents of liberated free chlorine and chlorine ions in order to avoid the resin from damaging the reflective layer. The quantity of chlorine is preferably not larger than 1 wt %, and more preferably not larger than 0.5 wt %.

A rate of the cation polymerization type photo-initiator per 100% by weight of the cation type ultraviolet ray curing resin is generally 0.1 to 20% by weight, and preferably 0.2 to 5% by weight. In order to use more effectively the wavelengths in the near infrared ray region or the visible radiation region in the wavelength band of the ultraviolet ray source, it is possible to use together a known optical sensitizer. As such optical sensitizer, there are anthracene, phenotiazine, benzylmethylketal, benzophenone, acetophenone, etc.

In order to improve various properties of the ultraviolet ray curing adhesive, it is possible to add, as other additives, a thermal polymerization hinibitor, an antioxidant represented by hindered phenol, hindered amine, phosphite, etc., a plasticizer, a silane coupling agent represented by epoxysilane, mercaptosilane, (meta)acrylsilane, etc., as required. Among them, one that has excellent solubility to the ultraviolet ray curing compound and does not hinder the ultraviolet ray transmissiveness is selected and used.

(e) With Respect to Second Recording Layer 5

The second recording layer 5 generally has higher sensitivity than a recording layer used for a single-sided recording medium ("single-sided" means for example, CD-R, DVD-R, DVD+R and the like). In this optical recording medium, since the power of an incident optical beam is decreased by the presence of the first recording layer 2 and the first reflective layer 3 or the like, recording is performed with a half of the power. Accordingly, the second recording layer 5 is required to have specifically high sensitivity.

For the purpose of realization of excellent recording/reading performance, it is desirable that the dye develops a little heat and has large refractive index.

Further, it is desirable that a combination of the second recording layer 5 and the second reflective layer 6 provides appropriate ranges of reflection and absorption of the light. Whereby, the recording sensitivity can be increased and the thermal interference during recording can be diminished.

The materials and deposition method of the second recording layer 5 are almost the same as the first recording layer 2, thus only the differences between them will be hereinafter described.

The film thickness of the second recording layer 5 is not specifically limited because the suitable film thickness differs according to the recording method, etc. In order to obtain sufficient modulation amplitude, the film thickness of the second recording layer 5 is preferably 10 nm or more in general, more preferably 30 nm or more, and particularly preferably 50 nm or more. However, the film is required not to be excessively thick in order to obtain appropriate reflectance, the film thickness is generally 3 μm or less, preferably 1 μm or less, and more preferably 200 nm or less.

The materials used for the first recording layer 2 and the second recording layer 5 may be the same or may differ from each other.

(f) With Respect to Second Reflective Layer 6

The second reflective layer 6 is required to have high reflectance. It is desirable that the reflective layer 6 is highly durable.

In order to secure high reflectance, the thickness of the second reflective layer 6 is preferably 20 nm or more, in general, more preferably 30 nm or more, and further preferably 50 nm or more. In order to shorten the tact time of the production and decrease the cost, it is preferable that the second reflective layer 6 is thin to some degree. Accordingly, the film thickness is generally 400 nm or less, and more preferably 300 nm or less.

As the material of the second reflective layer 6, it is possible to use, in pure metal or in a form of alloy, metals having sufficiently high reflectance at a wavelength of the reading light such as Au, Al, Ag, Cu, Ti, Cr, Ni, Pt, Ta and Pd, for example. Among them, Au, Al and Ag are suitable for the material of the second reflective layer 6 because they have high reflectance. Other than these as the main compositions, the second reflective layer 6 may contain the followings as other components. As examples of the other components, there are metals such as Mg, Se, Hf, V, Nb, Ru, W, Mn, Re, Fe, Co, Rh, Ir, Cu, Zn, Cd, Ga, In, Si, Ge, Te, Pb, Po, Sn, Bi and rare earth metals, and semimetals.

A film containing Ag as the main component is particularly preferable because the cost thereof is low, it provides high reflectance and a beautiful white ground color when a print accepting layer to be described later is further provided. Here, "main component" signifies a component whose rate of content is not less than 50 percent.

In order to secure high durability (high corrosion resistivity) of the second reflective layer 6, it is preferable to use Ag in the form of alloy rather than as pure silver.

Among the alloys, an alloy that contains Ag as the main component and contains 0.1 to 15 atomic percent of at least one element selected from the group consisting of Ti, Zn, Cu, Pd, Au and rare earth metals is preferable. When the alloy contains two or more of Ti, Zn, Cu, Pd, Au and rare earth metals, each of them may be contained 0.1 to 15 atomic percent. However, it is preferable that the sum of these is 0.1 to 15 atomic percent.

A particularly preferable composition of the alloy is that Ag is contained as the main component, 0.1 to 15 atomic percent of at least one element selected from the group consisting of Ti, Zn, Cu, Pd and Au is contained, and 0.1 to 15 atomic percent of at least one rear earth element is contained. Among rare earth elements, neodymium is particularly preferable. More concretely, AgPdCu, AgCuAu, AgCuAuNd, AgCuNd or the like is preferable.

As the second reflective layer 6, a layer made from only Au is preferable because its high durability (high corrosion resistance), but is more expensive than a layer made from only an Ag alloy.

It is possible to stack a thin film having low reflective index and a thin film having high reflective index, both of which are made from materials other than metals, one on the other to form a multilayer, and use it as the second reflective layer 6.

As a method for forming the second reflective layer 6, there are, for example, spattering, ion plating, chemical vapor deposition, vacuum evaporation, etc. It is possible to provide a known inorganic or organic intermediate layer or an adhesive layer on the upper surface and the lower surface of the second reflective layer 6 in order to improve the reflectance, recording performance, adhesive properties and so forth.

(g) With Respect to Adhesive Layer 7

The adhesive layer 7 is not required to be transparent. High adhesion and small shrinkage of the adhesive layer 7 at the time that the layer is hardened and adhered brings stability of the shape of the medium, which is preferable.

It is preferable that the adhesive layer 7 is made from a material that does not damage the second reflective layer 6. It is possible to provide a known inorganic or organic protective layer between the both layers in order to avoid the damage on the reflective layer 7.

In this optical recording medium, the film thickness of the adhesive layer 7 is preferably 2 µm or more, in general. In order to obtain predetermined adhesion, some degree of film thickness is required. More preferably, the film thickness of the adhesive layer 7 is 5 µm or more. Generally, it is preferable that the film thickness of the adhesive layer 7 is 100 µm or less in order to make the optical recording medium thin as much as possible. This is why a thick film requires a longer time to be hardened, which leads to a decrease in the productivity.

The material of the adhesive layer 7 may be the same as the material of the intermediate resin layer 4, or may be a pressure sensitive double-sided tape or the like. By putting the pressure sensitive double-sided tape between the second reflective layer 6 and the second substrate 8 and pressing them, the adhesive layer 7 can be formed.

(h) With Respect to Second Substrate 8

It is preferable that the second substrate 8 has shape stability so that the optical recording medium has some degree of rigidity. Namely, it is preferable that the second substrate 8 has high mechanical stability and large rigidity. It is also preferable that the second substrate 8 has large adhesion to the adhesive layer 7.

When the first substrate 1 does not have sufficient shape stability as above, the second substrate 8 is particularly required to have large shape stability. In this viewpoint, it is preferable that the second substrate 8 has low moisture absorption. The second substrate 8 is not required to be transparent. The second substrate 8 may be a mirror substrate, and is not required to have concavities and convexities thereon. Thus, the second substrate 8 is not always required to have good transfer property in injection molding.

As such material, the same material as that used for the first substrate 1 can be used. Other than this, there can be used an Al alloy substrate containing Al as the main component such as an Al-Mg alloy or the like, an Mg alloy substrate containing Mg as the main component such as an Mg—Zn alloy or the like, a substrate made from any one of silicon, titanium and ceramics, or a substrate made by combining them.

In the viewpoint of high productivity such as molding property and the like, cost, low moisture absorption, shape stability, etc., polycarbonate is preferable. In the viewpoint of chemical resistance, low moisture absorption, etc., amorphous polyolefin is preferable. In the viewpoint of high-speed responsibility, etc., a glass substrate is preferable.

In order to give sufficient rigidity to the optical recording medium, it is preferable that the second substrate 8 is thick to some degree, having a thickness of not less than 0.3 mm. However, since a thinner second substrate 8 is more advantageous to make the recording/reading apparatus thinner, the thickness of the second substrate 8 is preferably 3 mm or less, and more preferably 1.5 mm or less.

The second substrate 8 may be a mirror substrate not having concavities and convexities thereon. From the standpoint of easy production, it is preferable that the second substrate 8 is manufactured in injection molding.

An example of a preferable combination of the first substrate 1 and the second substrate 8 is that the first substrate 1 and the second substrate 8 are made from the same material, and have the same thickness. By doing so, the rigidity of the first substrate 1 and the second substrate 8 are equivalent, which gives good mechanical balance. Whereby, the medium is prone not deform due to changes in environment, which is preferable. In which case, it is preferable that deformation of each substrate occurs in the same direction and in the same degree in case of the environmental changes.

As another preferable example of the combination, the first substrate 1 is as thin as about 0.1 mm, whereas the second substrate 8 is as thick as about 1.1 mm. By doing so, the objective lens can easily approach the recording layer, whereby the recoding density is easily increased. Accordingly, this is preferable. In this case, the first substrate 1 may be in sheet-like shape.

(i) With Respect to Other Layers

In this layered structure, another layer may be arbitrarily put in the layers as required. Alternatively, it is possible to arbitrarily provide another layer on the outermost surface of the medium. In concrete, it is possible to provide a buffer layer as an intermediate layer between the first reflective layer 3 and the intermediate resin layer 4, the intermediate resin layer 4 and the second recording layer 5, or the second reflective layer 6 and the adhesive layer 7, for example.

The buffer layer is to prevent two layers from dissolving in each other and prevent the two layers from blending to each other. The buffer layer may have another function than the function of preventing the dissolving phenomenon. Further, still another intermediate layer may be put as required.

The material of the buffer layer is required to be immiscible with the second recording layer 5 or the intermediate resin layer 4, and be optically transmittable to some degree. The known inorganic or organic material can be used for the buffer layer. In the viewpoint of the properties, an organic material is preferably used. For example, (i) metal or semiconductor, (ii) oxide, nitride, sulfide, trisulfide, fluoride or carbide of metal or semiconductor, and (iii) amorphous carbon or the like are available. Among these, a layer made from an almost transparent dielectric substance, or a very thin metal layer (including alloy) is preferable.

In concrete, oxides such as silicon oxide, particularly, silicon dioxide, zinc oxide, cerium oxide, yttrium oxide and the like; sulfides such as zinc sulfide, yttrium sulfide and the like; nitrides such as silicon nitride and the like; silicon carbide; a mixture (trisulfide) of an oxide and sulfur; and alloys to be described later are preferable. A mixture of silicon oxide and zinc sulfide at a ratio of approximately 30:70 to 90:10 is preferable. A mixture ($Y_2O_2S$—ZnO) of sulfur, yttrium dioxide and zinc oxide is also preferable.

As the metal or alloy, silver or an alloy that contains silver as the main component and 0.1 to 15 atomic percent of at least one element selected from the group consisting of titanium, zinc, copper, palladium and gold is preferable. An alloy that contains silver as the main component and 0.1 to 15 atomic percent of at least one rare earth element is preferable, as well. As the rare earth element, neodymium, praseodymium, cerium or the like is preferable.

Alternatively, any resin layer can be used so long as it does not solve the dye in the recording layer when the buffer layer is made. Particularly, a polymer film which can be manufactured in vacuum evaporation or CVD method is useful.

The thickness of the buffer layer is preferably 2 nm or more, and more preferably 5 nm or more. When the buffer layer is excessively thin, prevention of the above mixing phenomenon tends to be insufficient. The thickness of the buffer layer is preferably 2000 nm or less, and more preferably 500 nm or less. Excessive thick buffer layer is not only necessary for prevention of the mixing but also may cause a decrease in the optical transmission. When the layer is made from an inorganic substance, the film deposition of the layer takes a longer time, which causes a decrease in productivity, or the film stress is increased. Thus, the film thickness is preferably 200 nm or less. Particularly, since a film made from a metal excessively deteriorates the optical transmittance, the film thickness is preferably approximately 20 nm or less.

A protective layer may be provided in order to protect the recording layer or the reflective layer. The material of the protective layer is not specifically limited but any material is available so long as it protects the recording layer or the reflective layer from the external force. As an organic material of the protective layer, there are a thermal plastic resin, a thermal setting resin, an electron beam setting resin, a ultraviolet ray curing resin and the like. As an organic material of the protective layer, there are silicon oxide, silicon nitride, $MgF_2$, $SnO_2$ and the like.

The protective layer can be formed by dissolving a thermal plastic resin, a thermal setting resin or the like in an appropriate solvent to prepare a coating solution, and applying and drying the solution. In the case of a ultraviolet ray curing resin, the protective layer can be formed by preparing a coating solution of the ultraviolet ray curing resin itself or a coating solution obtained by dissolving the ultraviolet ray curing resin in an appropriate solvent, applying the coating solution, irradiating UV light to set the solution. As the ultraviolet ray curing resins, there are acrylate resins such as urethane acrylate, expoxy acrylate, polyester acrylate, etc. These materials can be used solely or can be mixed to be used. Further, use of not only a single layer but also a multilayer is possible.

As the method of forming the protective layer, there are coating methods such as spin coating, cast and the like, sputtering, chemical evaporation, etc. Among these, spin coating is preferable.

The film thickness of the protective layer is generally within a range from 0.1 to 100 µm. In this optical recording medium, the film thickness of the protective layer is preferably from 3 to 50 µm.

A print accepting layer, on which writing (printing) is possible with various printers such as ink-jet printer, thermal printer and the like, or various writing tools, may be put on a surface that is not a surface through which the recording/reading beam comes in, as required.

Alternatively, another recording layer(s) may be put to form the optical recording medium having three or more recording layers. It is possible to bond two optical recording medium having this layer structure, with the first substrate 1 being on the outer side, to form a larger-capacity medium having four recording layers.

(B) Type 2

Figure 2:
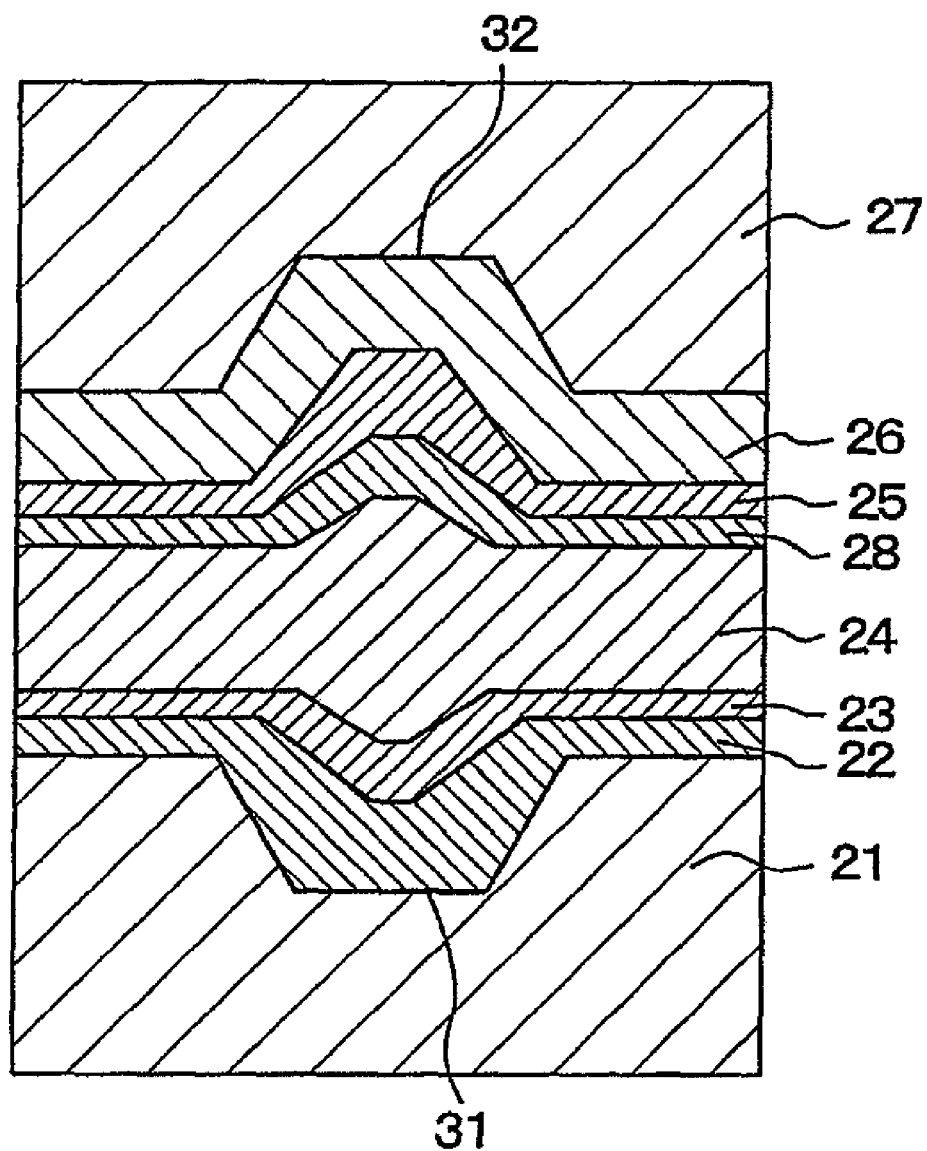
FIG. 2 is a diagram typically showing the whole structure of an optical recording medium (of type 2) according to the embodiment of this invention.

FIG. 2 is a sectional view typically showing an optical recording medium (of type 2) according to this embodiment.

The optical recording medium (optical recording medium of the bonded, single-sided incident type) of type 2 according to this embodiment has a first recording layer (first recording layer, first dye containing recording layer) 22 containing a dye, a semitransparent first reflective layer (hereinafter referred to as a semitransparent reflective layer) 23, a transparent adhesive layer (intermediate layer) 24, a buffer layer 28, a second recording layer (second recording layer, second dye containing recording layer) 25 containing a dye, a second reflective layer 26, a transparent, disk-like shaped second substrate (second substrate) 27 in this order on a disk-like shaped, transparent (light-transmissible) first substrate (first substrate, first light-transmissible substrate) 21. The light beam is irradiated from the side of the first substrate 21 to perform recording/reading. In this embodiment, "transparent" signifies "transparent" to the optical beams used for recording on and reading from the optical recording medium.

Concavities and convexities are formed on the first substrate 21 and the second substrate 27 to form respective recording tracks. A recording track 31 on the first substrate 21 is formed with the convex portion with respect to the direction of the incident light beams, whereas a recording track 32 on the second substrate 27 is formed with the concave portion with respect to the direction of the incident light beams.

Meanwhile, the recording track 31 may be formed with the groove of the first substrate 21, that is, the concave portion with respect to the direction of incident light beams, whereas the recording track 32 may be formed with the groove of the second substrate 27, that is, the convex portion with respect to the direction of incident light beams. Generally, it is preferable that the recording track 31 is formed with the convex portion with respect to the direction of incident light beam, whereas the recording track 32 is formed with the concave portion with respect to the direction of incident light beams. It is possible to provide concave or convex pits other than the above as required. In this embodiment, concavity and convexity are defined with respect to the direction of an incident light beam used for recording or reading unless not specifically mentioned.

Next, each of the layers will be described.

The first substrate 21, the first recording layer 22, the first reflective layer 23, the second recording layer 25 and the second reflective layer 26 of the optical recording medium of the type 2 according to this embodiment are almost similar to the first substrate 1, the first recording layer 2, the first reflective layer 3, the second recording layer 5 and the second reflective layer 6 of the optical recording medium of the type 1.

The transparent adhesive layer 24 as being the intermediate layer is almost similar to the intermediate resin layer 4 of the optical recording medium of the type 1 except that there is no need to form the grooves and pits with concavities and convexities. Incidentally, the above grooves and pits are formed on the second substrate 27 to be described later in the optical recording medium of the type 2.

The buffer layer 28 as being the intermediate layer is almost similar in structure to the buffer layer described above in the first embodiment. The buffer layer may be formed only when necessary.

It is preferable that the second substrate 27 is transparent, and has shape stability so that the optical recording medium has some degree of rigidity. Namely, it is preferable that the second substrate 27 has high mechanical stability and large rigidity.

As such material, there can be used resins such as acrylic resins, methacrylic resins, polycarbonate resin, polyolefin resins (particularly amorphous polyolefin), polyester resins, polystyrene resin, epoxy resin and so forth, and glass.

On the second substrate 27, concavities and convexities are spirally or concentrically formed to form grooves and lands. Generally, such grooves and/or lands are used as recording tracks to record or read information on or from the second recording layer 25. Since the second recording layer 25 is generally formed in coating, the film thickness thereof is large at the groove portion so that the groove portion is suitable for recording and reading. It is preferable in this optical recording medium to assign the groove portion, that is, the concave portion with respect to the direction of the incident light beam, of the second substrate 27 as the recording track 32. Here, "concave portion" and "convex portion" signify "concave portion" and "convex portion" with respect to the direction of the incident light beam. Generally, the groove has a width of about 50 to 500 nm, and has a depth of about 10 to 250 nm. When the recording track is spiral, it is preferable that the track pitch is approximately 0.1 to 2.0 µm. The second substrate 27 may have concave/convex pits such as Land Pre-Pit as required.

From the standpoint of cost, it is preferable that the second substrate 27 having such concavities and convexities is made from a resin and manufactured in injection molding with a stamper having concavities and convexities. When a resin layer made from a radiation-setting resin such as a photo-setting resin or the like is formed on the substrate body made from glass or the like, concavities and convexities for recording tracks or the like may be formed on the resin layer.

As having been discussed a write-once optical recording medium (DVD-R) having a dye containing recording layer having the above structure up to this point, the optical recording medium is not limited to this example, but this invention can be applied to any optical recording medium so long as it has a plurality of recording layers on which information can be recorded and read by irradiating a laser beam from one side thereof. For example, this invention can be applied to a rewritable optical recording medium (for example, DVD-RW, DVD+RW, DVD-RAM or the like) having a phase-change recording layer as being a recording layer in which a portion in the crystalline state is used as the unrecorded state/erased state, whereas a portion in the amorphous state is used as the recorded state, or an magneto-optical recording medium having a magnetic recording layer as the recording layer, for example.

When the optical recording medium is a DVD-RW, address information can be beforehand recorded with Land Pre-Pit, like the above DVD-R. When the optical recording medium is a DVD+RW, address information can be beforehand superposed on the wobble and recorded (this is referred to as ADIP: Address in Pre-groove).

When this invention is applied to a rewritable optical recording medium containing a phase-change recording layer, each of the first recording layer and the second recording layer of the optical recording medium in the above embodiment is comprised of a first protective layer, an information recording layer and a second protective layer.

As the material of this information recording layer, it is preferable to use a material whose optical constant (refractive index n, extinction coefficient k) is changed by irradiating a laser beam. As such material, there are, chalcogenides based on Te or Se such as alloys containing Ge—Sb—Te, Ge—Te, Pd—Ge—Sb—Te, In—Sb—Te, Sb—Te, Ag—In—Sb—Te, Ge—Sb—Bi—Te, Ge—Sb—Se—Te, Ge—Sn—Te, Ge—Sn—Te—Au, Ge—Sb—Te—Cr, In—Se, In—Se—Co or the like as the main component, and alloys to which nitrogen, oxygen, etc. are appropriately added to the former alloys, for example.

As the material of the first protective layer and the second protective layer, it is preferable to use a material which is physically and chemically stable, has higher melting point than that of the information recording layer and high softening temperature, and is not mutually soluble with the material of the information recording layer in order to suppress an increase in noise due to thermal damage of the protective substrate, the information recording layer and the like at the time of irradiation of the laser beam, adjust the reflectance and absorptivity to the laser beam, the phase of the reflected light, etc. As such material, there are oxides of Y, Ce, Ti, Zr, Nb, Ta, Co, Zn, Al, Si, Ge, Sn, Pb, Sb, Bi, Te or the like, nitrides of Ti, Zr, Nb, Ta, Cr, Mo, W, B, Al, Ga, In, Si, Ge, Sn, Pb or the like, carbides of Ti, Zr, Nb, Ta, Cr, Mo, W, Si or the like, sulfides of Zn, Cd or the like, selenides, tellurides, fluorides of Mg, Ca or the like, simple substances of C, Si, Ge and the like, dielectrics made from mixtures of these, and materials treated in the same way as the dielectrics, for example. For the first protective layer and the second protective layer, different materials may be used as needed, or the same material may be used.

In a single-sided incident type optical recording medium (for example, single-sided incident type DVD-R of the dual-layer type) having a plurality (here, two) recording layers 2 and 5 (22 and 25), on which information is recorded in or read from each of the layers by irradiating a laser beam from one side thereof, (optimum) recording/reading conditions such as tracking polarity, recording pulse strategy, recoding power, reading power, etc. largely vary according to each recording layer.

Particularly, it is essential to optimize the recording conditions of layers 2 and 5 and of layers 22 and 25. It is rare that reading is impossible even when the reading conditions deviate a little. However, when the recording conditions are not optimum, information may not be practically recorded. Or, even when information could be recorded, the signal quantity sometimes deteriorates when the information is read.

For this, it is desirable that information can be recorded and read accurately and surely under recording/reading conditions (for example, tracking polarity, recording pulse strategy, recording power, reading power, etc.) adapted to a recording layer 2 or 5 (22 or 25) on which recording and reading of the information are to be performed.

Particularly, in the optical recording medium of the type 1, the groove, that is, a convex portion with respect to the direction of the incident light beam, of the first substrate 1 is used as the recording track 11, whereas the groove, that is, a convex portion with respect to the direction of the incident light beam, of the intermediate resin layer 4 is used as the recording track 12, whereby the first recording layer 2 and the second recording layer 5 have the same tracking polarity. On the other hand, in the optical recording medium of the type 2, the groove, that is, a convex portion with respect to the direction of the incident light beam, of the first substrate 21 is used as the recording track 31, whereas the groove, that is, a concave portion with respect to the direction of the incident light beam, of the second substrate 27 is used as the recording track 32, thus the first recoding layer 22 and the second recording layer 25 have opposite tracking polarities.

Even when an optical recording medium whose first recording layer and second recording layer have the same tracking polarity and an optical recording medium whose first recording layer and second recording layer have opposite tracking polarities are used together, it is desirable to accurately and surely record and read information with a tracking polarity adapted to the structure of an optical recording medium.

According to this embodiment, at least one of the recording/reading conditions for each of the recording layers 2 and 5 (22 and 25) of the optical recording medium is recorded in the optical recording medium.

Here, the recording/reading conditions include information about tracking polarity (for example, the polarity of push-pull signal) or land recording/groove recording (information representing whether tracking is performed with land or groove) (hereinafter, these are collectively referred to as tracking polarity or tracking information), recording pulse strategy (recording strategy, write strategy; laser output control pattern adapted to each recording layer), recording power, reading power and so forth. Incidentally, the recording/reading conditions include recording conditions such as tracking polarity, recording pulse strategy (write strategy), recording power, and so forth, and reading conditions such as tracking polarity, reading power, and so forth.

Among these recording/reading conditions, recording/reading conditions such as recording pulse strategy, recording power and reading power and so forth other than tracking polarity may be recorded in each of the recording layers 2 and 5 (22 and 25) configuring the optical recording medium, or may be recorded in either the recording layer 2 or 5 (22 or 25).

There is an idea that, among the above recording/reading conditions, the tracking polarity of a recording layer other than a recording layer to which the drive first accesses is recorded in the recording layer to which the drive first accesses (for example, a recording layer closest to the side from which the laser beam comes in). In other words, the tracking polarity may be recorded in only a recording layer to which the drive first accesses (that is, only one layer among the plural recording layers).

In case where the tracking polarity is mismatched to the recording layer, the recorded information can not be read. For this, it is necessary to beforehand determine the tracking polarity (land recording or groove recording) of a recording layer to which the drive first accesses (for example, a recording layer closest to the side from which the laser beam comes in).

In DVD-R having two recording layers, it is beforehand determined that information is recorded on the convex portion with respect to the incident light beam (land recording) on the first recording layer (a recording layer closest to the side from which the laser beam comes in) 2 (22), and the drive first accesses to the first recording layer 2 (22). By relating the tracking polarity of the other recording layer [the second recording layer 5 (25)] to layer information and recording them in the first recording layer 2 (22), the drive can recognize the tracking polarity of the second recording layer 5 (25) by reading out them.

Alternatively, the tracking polarity of the second recording layer 5 (25) other than the first recording layer 2 (22) may be beforehand determined like the first recording layer 2 (22). In which case, it is unnecessary to record the tracking polarity of the second recording layer 5 (25) in the first recording layer 2 (22).

Even when the tracking polarity of the recording layer 5 (25) is beforehand determined, the tracking polarity of the second recording layer 5 (25) may be recorded in the first recording layer 2 (22), and the drive may read out it and change the predetermined tracking polarity. Whereby, the tracking polarity of a recording layer other than a recording layer to which the drive first accesses can be arbitrarily changed.

Accordingly, it is preferable that the recording/reading conditions are recorded in only a layer closest to a side from which the laser beam comes in between the recording layers 2 and 5 (22 and 25) because the drive (recording/reading apparatus) generally first accesses to a layer closest to the side from which the laser beam comes in. Thus, the drive in such structure can quickly read the recording/reading conditions.

In concrete, it is preferable that the recording/reading conditions are recorded in a recording management area (RMA; for example, control track, the innermost peripheral portion) of either the recording layers 2 or 5 (22 or 25) with pre-pits (Land Pre-Pit) or wobble.

Recording of the recording/reading conditions such as tracking polarity, recording pulse strategy, recording recommended power, reading recommended power, and so forth is effective in an optical recording medium of the type 2 having the following structure. It is particularly important that in the optical recording medium of the type 2, the tracking polarity is included in the recording/reading conditions.

Namely, the optical recording medium of the type 2 to which this invention is preferably applied has a first information recording body formed by stacking at least a recording layer containing a first dye and a semi-transparent reflective layer in order on a first substrate having guide grooves, and a second information recording body formed by stacking at least a reflective layer and a recording layer containing a second dye in order on a second substrate having guide grooves. The optical recording medium of the type 2 is formed by bonding the first information recording body and the second information recording body to each other with the sides on which the recording layers are formed being faced to each other through an optically transparent adhesive layer. The laser beam is irradiated from the first substrate's side to optically record or read information.

It is desirable, in the recording/reading apparatus (drive) which performs recording and reading of information on each of the recording layers 2 and 5 (22 and 25) of a single-sided incident type optical recording medium having a plurality of recording layers, that the recording/reading conditions such as recording pulse strategy, recording power, reading power, and so forth can be switched according to a recording layer 2 or 5 (22 or 25), and recording and reading of information can be performed accurately and surely. Since it is particularly important that the recording conditions are made optimum, it is desirable that the recording conditions can be switched to the optimum ones according to a recording layer 2 or 5 (22 or 25) so that information can be recorded accurately and surely.

In such case, there is an idea of continuously attaching address information to a plurality of recording layers 2 and 5 (22 and 25), and telling which layer is which layer on the basis of the read address information in the recording/reading apparatus. However, it is still difficult to instantaneously tell which layer is which layer.

According to this embodiment, layer information (information about the recording layer number; layer 0, layer 1) is recorded in each of the recording layers 2 and 5 (22 and 25) of the optical recording medium so that the recording/reading conditions such as recording pulse strategy (recording strategy, write strategy), recording power, reading power, and so forth can be instantaneously switched according to a recording layer 2 or 5 on which recording or reading of information is to be performed.

As a recording method of the layer information, the following methods shown in (i) and (ii) below are conceivable, for example.

(i) Recording layer information in the recording management area (RMA; for example, control track, the innermost portion) of each of the recording layers 2 and 5 (22 and 25) with, for example, pre-pits (Land Pre-Pit) or wobble.

(ii) Recording layer information on almost the entire surface of the recording area of each of the recording layers 2 and 5 (22 and 25) with, for example, pre-pit (Land Pre-Pit) or wobble.

Here, "recording on almost the entire surface" includes "recording on almost the entire surface of the recording area including the recording management area of each of the recording layers 2 and 5 (22 and 25) (for example, recording layer information as a part of address in the recording management area)," "recording layer information on the entire surface of the recording area excepting the recording management area of each of the recording layers 2 and 5 (22 and 25)," etc. Particularly, when the layer information cannot be recorded in the recording management area, it is effective to record the layer information on the entire surface of the recording area excepting the recording management area. This is also effective on the occasion of a random access for information recording or reading.

For example, the layer information can be recorded as a part of address information of wobble or pre-pit (Land Pre-Pit). Whereby, it becomes possible to record the layer information on each of the recording layers 2 and 5 (22 and 25) in a simple manner. Recording the layer information as a part of address information can provide an advantage that when a random access is had to record or read information on the basis of the address information, it is possible to read out the layer information only by accessing to a desired address and performing the focusing servo control thereon. Whereby, it is possible to instantaneously switch the recording/reading conditions such as recording pulse strategy, recording power, reading power, and so forth on the basis of the layer information.

As a method for recording the layer information as a part of address information, methods described in (i) through (v) below are conceivable, for example.

(i) As a method of recording the layer information as a part of address information in wobble (for example, ADIP; Address in pre-groove), reversing the sync pattern (synchronization pattern) included in the address information (for example, ADIP; Address in pre-groove) in wobble on either one of the two recording layers 2 and 5 (22 and 25), for example.

For example, the direction of the sync pattern (synchronization pattern) included in the ADIP of the second recording layer 5 (25) is reversed (is made opposite to) with respect to the direction of the sync pattern (synchronization pattern) included in the ADIP of the first recording layer 2 (22).

(ii) As a method of recording the layer information as a part of the address information in wobble or Land Pre-Pit formed in the recording area (including the recording management area) of each of the recording layers 2 and 5 (22 and 25), making the values of the reserved bit(s) differ from each other in the recording layers 2 and 5 (22 and 25).

For example, the value of the reserved bit(s) of address information in wobble or LPP formed in the recording area (including recording management area) of the first recording layer 2 (22) is made differ from the value of the reserved bits of address information in wobble or Land Pre-Pit formed in the recording area (including recording management area) of the second recording layer 5 (25).

Here, "reserved bit(s)" means a bit (s) present in a portion not currently used in an area in which the address information is recorded. The same modulation system or recording system as used for the address information can be applied to recording of information in the reserved bit(s). When the medium has a plurality of recording layers, it is necessary to increase the number of reserved bits to be used according to the number of layers of the recording layers. For example, when the medium has two recording layers, one bit is used as the reserved bit, and it is possible to discriminate the first layer from the second layer on the basis of whether the value of this bit is 0 or 1. When two bits are used as the reserved bits, it is possible to discriminate four recording layers from one anther because four values, that is, 00, 01, 10 and 11, can be expressed with two bits. Similarly, when three bits are used as the reserved bits, it is possible to discriminate eight recording layers from one another because eight values can be expressed. Namely, when n bits are used as the reserved bits, it is possible to discriminate $2^n$ recording layers. If this method is combined with another method such as the above method (i) or the following methods (ii) through (v), it is possible to decrease the number of reserved bits to be used.

(iii) As a method for recording the layer information as a part of address information in wobble or Land Pre-Pit formed in a recording area (including recoding management area) of each of the recording layers 2 and 5 (22 and 25), there is a method of inverting bits of the whole address information in wobble or Land Pre-Pit in either one of the two recording layers 2 and 5 (22 and 25).

For example, when addresses 3000-4FFF (Hex) are put in the first recording layer 2 (22) and addresses 5000-6FFF (Hex) are put in the second recording layer 5 (25), only the bits in the second recording layer 5 (25) are inverted to yield addresses AFFF-9000 (Hex).

Here, the description is made, by way of 16 bits (four digits in the case of hexadecimal notation) for the sake of simplifying the explanation. Since the address information is practically expressed in 48 bits (12 digits in the hexadecimal notation) in, for example, DVD-R, adding an allowance, the addresses in the first recording layer 2 (22) are 000000003000-000000004FFF (Hex), whereas the addresses in the second recording layer 5 (25) are FFFFFFFFAFFF-FFFFFFFF9000 (Hex).

Meanwhile, it is necessary to give the drive relationship information showing which range of addresses belongs to which layer, whereby the drive can discriminate a layer when reading out an address.

(iv) As a method for recording the layer information as a part of address information in wobble or pre-pits formed in the recording area (including recording management area) of each of the recording layers 2 and 5 (22 and 25), there is a method of expressing the whole address information in wobble or Land Pre-Pit on either one of the two recording layers 2 and 5 (22 and 25) by two's complement (inverted whole bits+1).

For example, when addresses 3000-4FFF (Hex) are put in the first recording layer 2 (22) and addresses 5000-6FFF (Hex) are put in the second recording layer 5 (25), the second recording layer 5 (25) is expressed by two's complement (inverted whole bits+1), thus the addresses are B000-9001 (Hex).

Here, the description is made by way of only 16 bits (four digits in hexadecimal notation) for the sake of simplifying the explanation. Since the address information is practically expressed by 48 bits (12 digits in hexadecimal notation) in, for example, DVD-R, adding an allowance, the addresses of the first recording layer 2 (22) are 000000003000-000000004FFF (Hex), whereas the addresses of the second recording layer 5 (25) are FFFFFFFFB000-FFFFFFFF9001 (Hex).

Meanwhile, it is necessary to give the drive relationship information showing which range of addresses belongs to which layer, whereby the drive can discriminate a layer when reading out an address.

(v) As a method of recording the layer information as a part of address information in wobble or Land Pre-Pit formed in the recording area (including recording management area) of each of the recording layers 2 and 5 (22 and 25), there is a method of recording the layer information at the most significant bit of address information in wobble or Land Pre-Pit on either one of the two recording layers 2 and 5 (22 and 25).

For example, a value obtained by inverting a value of the most significant bit of address information in wobble or Land Pre-Pit on either the first recording layer 2 (22) or the second recording layer 5 (25) is put in the most significant bit of address information in wobble or Land Pre-Pit on the other recording layer.

Practically, when addresses 000000003000-000000004FFF (Hex) are put in the first recording layer 2 (22) and addresses 000000005000-000000006FFF (Hex) are put in the second recording layer 5 (25), for example, only the most significant bit in the second recording layer 5 (25) is inverted.

When a bit is inverted in a binary number, "0" becomes "1". When this is expressed in a hexadecimal number (Hex), "0" becomes "8" in this case. Accordingly, the addresses in the first recording layer 2 (22) are 000000003000-000000004FFF (Hex), whereas the addresses in the second recording layer 5 (25) are 800000005000-800000006FFF (Hex). Incidentally, the drive is required to recognize the most significant bit of addresses as the layer information.

Up to this point, the description has been made by way of example where this invention is applied to an optical recording medium having two recording layers on which information can be recorded or read by irradiating a laser beam from one side thereof. However, the present invention is not limited to this example. For example, the above layer information recording methods can be applied, solely or in combination, to an optical recording medium having three or more recording layers on which recording or reading of information can be performed by irradiating a laser beam from one side thereof. In which case, the above layer information recording method can be applied to neighboring two recording layers among the plural recording layers.

(2) Optical Recording Medium Recording/Reading Method

Hereinafter, description will be made of the outline of the optical recording medium recording/reading method structured as above.

Recording on this optical recording medium (of the type 1 or the type 2) obtained as above is performed by irradiating a laser beam focused to a diameter of about 0.5 to 1 µm on the recording layer from the side of the first substrate 1 or 21. In a portion on which the laser beam is irradiated, terminal deformation of the recording layer such as decomposition, exothermic reaction, dissolution, etc. occurs due to absorption of the energy of the laser beam, whereby the optical properties thereof are changed.

Reading of recorded information is performed by reading, with the laser beam, a difference in reflectance between a portion in which the optical properties have changed and a portion in which the optical properties remain unchanged.

Recording and reading are performed on each of the two recording layers in the following manner. Whether the focusing position of the focused laser beam is on the first recording layer 2 or 22, or the second recording layer 5 or 25 can be discriminated by using a focus error signal obtained in the knife edge method, astigmatism method, Foucault method or the like. Namely, when the objective lens for focusing the laser beam is shifted in the vertical direction, a different S-shaped curve is obtained according to whether the focus position of the laser beam is on the first recording layer 2 or 22, or on the second recording layer 5 or 25. It is possible to select the first recording layer 2 or 22, or the second recording layer 5 or 25 to be recorded or read by selecting which S-shaped curve is used.

In the optical recording medium of the type 1, it is preferable that concavities and convexities are formed on the first substrate 1 and the intermediate resin layer 4, and the convex portion of the first substrate 1 and the convex portion of the intermediate resin layer 4 are used as recording tracks to perform recording and reading, as shown in FIG. 1. Since the dye recording layer is generally formed in coating, the film thereof is thick at the groove, which is thus suitable for recording and reading. In the optical recording medium of the type 1, it is preferable that the groove, that is, the convex portion to the direction of the incident light beam, of the first substrate 1 is used as a recording track 11, whereas the groove, that is, the convex portion to the direction of the incident light beam, of the intermediate resin layer 4 is used as a recording track 12.

In the optical recording of the type 2, it is preferable that concavities and convexities are formed on the first substrate 21 and the second substrate 27, and the convex portion of the first substrate 21 and the concave portion of the second substrate 27 are used as recording tracks to perform recording and reading, as shown in FIG. 2. Incidentally, there is a case where the polarity of the tracking servo control on the first recording layer 22 is opposite to that of the tracking servo control on the second recording layer 25. In the optical recording medium of the type 2, it is preferable that the groove, that is, the convex portion to the direction of the incident light beam, of the first substrate 21 is used as a recording track 31, whereas the groove, that is the concave portion to the direction of the incident light beam, of the second substrate 27 is used as a recording track 32.

As the laser beam used for this optical recording media (of the type 1 and the type 2), $N_2$, He—Cd, Ar, He—Ne, ruby, semiconductor, dye laser, etc. are available. Among these, the semiconductor laser is preferable because of its light weight, compactness, facility, etc.

It is preferable that the wavelength of the used laser beam is as shorter as possible for the purpose of high-density recording. Particularly, the laser beam having a wavelength of 350 to 530 nm is preferable. As a typical example of such laser beam, there are laser beams having center wavelengths of 405 nm, 410 nm and 515 nm.

An example of the laser beam having a wavelength within a range from 350 to 530 nm can be obtained by using a 405 nm or 410 nm blue high-power semiconductor laser or a 515 nm bluish green high-power semiconductor laser. Other than these, the laser beam can be obtained by wavelength-modulating, by means of a second harmonic generating element (SHG), either (a) a semiconductor laser that can continuously oscillate fundamental oscillation wavelengths of 740 to 960 nm, or (b) a solid state laser that is excited by a semiconductor laser to be able to continuously oscillate fundamental oscillation wavelengths of 740 to 960 nm.

As the above SHG, any piezo element lacking inversion symmetry is usable, but KDP, ADP, BNN, KN, LBO and compound semiconductors are preferable. As practical examples of the second harmonic wave, there are 430 nm which is a double of 860 nm in the case of a semiconductor laser having a fundamental oscillation wavelength of 860 nm, 430 nm which is a double of 860 nm from Cr-doped $LiSrAlF_6$ crystal (having a fundamental oscillation wavelength of 860 nm) in the case of a solid laser excited by a semiconductor laser, etc.

(3) Optical Recording Medium Recording/Reading Apparatus

An optical recording medium recording/reading apparatus, which performs recording or reading of information on an optical recording medium on which information (layer information) about the recording layer number of each of recording layers is recorded, is structured as follows.

The recording/reading apparatus (drive) is required only to record information on an optical recording medium or read information recorded in an optical recording medium from the same. For example, the recording/reading apparatus includes a recording apparatus (writer) for performing only recording, a reading apparatus (reader) for performing only reading, and a recording/reading apparatus (reader/writer) for performing both recording and reading.

Figure 3:
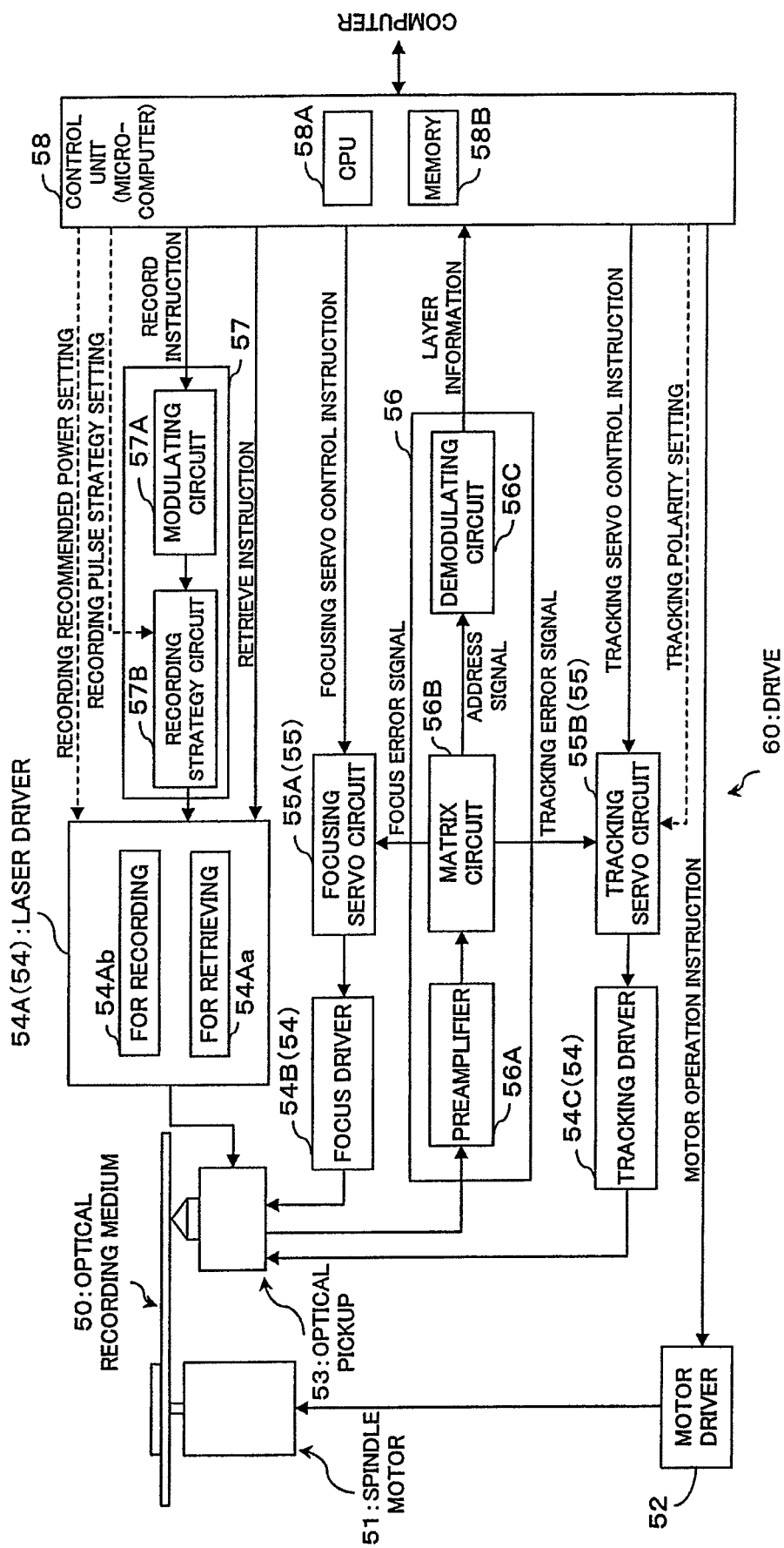
FIG. 3 is a diagram typically showing the whole structure of a recording/reading apparatus for the optical recording medium according to the embodiment of this invention.

As shown in FIG. 3, the recording/reading apparatus 60 comprises a spindle motor 51 for driving and rotating an optical recording medium 50, a motor driver 52 for driving the spindle motor 51, an optical pickup 53, a optical pickup driver 54 for driving the optical pickup 53, a servo processor 55 used to perform various servo controls, a signal processing unit (read processing unit) 56 for processing signals detected by the optical pickup 53, a data processing unit (record processing unit) 57 for processing information (data) sent from another computer or the like, and a control unit 58 (for example, a microcomputer having a CPU 58A and memory 58B) for controlling the devices.

The optical pickup 53 comprises a laser diode, an optical detector (for example, photo-detector), a pickup actuator used for focusing or tracking, etc., for example.

The optical pickup driver 54 comprises, as shown in FIG. 3, a laser driver (laser diode driver) 54A driving the laser diode, a focus driver 54B driving a pickup actuator, and a tracking driver 54C driving the pickup actuator.

The laser driver 54A comprises a reading laser driver 54Aa which drives a reading laser diode, and a recording laser driver 54Ab which drives a recording laser diode.

The servo processor 55 comprises a focusing servo circuit 55A for performing the focusing servo control, and a tracking servo circuit 55B for performing the tracking servo control.

The signal processing unit 56 comprises a preamplifier 56A for amplifying a signal detected by the optical pickup 53, a matrix circuit 56B for generating a focus error signal, a tracking error signal, an address signal of wobble or Land Pre-Pit [address information (including layer information)] from a detected signal amplified by the preamplifier 56A, data signals (information) including information on recording/reading conditions such as recording pulse strategy, recording power, reading power, tracking polarity and so forth, etc., and a demodulating circuit 56C for demodulating an address signal [address information; including recording layer number (layer information)] generated by the matrix circuit 56B. Incidentally, a data signal generated by the matrix circuit 56B is processed through a binary coding circuit, a demodulating circuit, etc., then sent to a computer or the like.

In the case where address information including layer information, and information on the recording/reading conditions such as recording pulse strategy, recording recommended power, reading recommended power, tracking polarity and so forth are recorded with pre-pits (ROM pits) in manufacturing the optical recording medium 50, the signal processing unit 56 may be comprised of a matrix circuit, a binary coding circuit and a modulating circuit.

The data processing unit 57 comprises a modulating circuit 57A for modulating data sent from another computer or the like together with address information, and a recording strategy circuit (write strategy circuit) 57B for performing a control (multi-pulse modulation on recording pulses) on recording pulses to be sent to the recording laser driver 54Ab on the basis of the modulated data.

Next, description will be made of processes (recording/reading method, recording method, reading method for optical recording medium) performed by executing predetermined programs by the control unit 58 of the recording/reading apparatus 60 for the optical recording medium structured as above, with reference to FIGS. 4 through 6.

Hereinafter, the description will be made, taking a case where information is recorded on (or read from) the optical recording medium 50 having two recording layers 2 and 5 (22 and 25), on which layer information is recorded on almost the entire surface of the recording layers, as an example.

First, a recording/reading method [first recording/reading method] including a layer information reading step and a recording/reading control step will be described with reference to FIG. 4. Next, a recording/reading method [second recording/reading method] including a recording/reading conditions reading step in addition to the above steps will be described with reference to FIGS. 5 and 6.

[First Recording/Reading Method]

(Recording Method for Optical Recording Medium)

Figure 4:
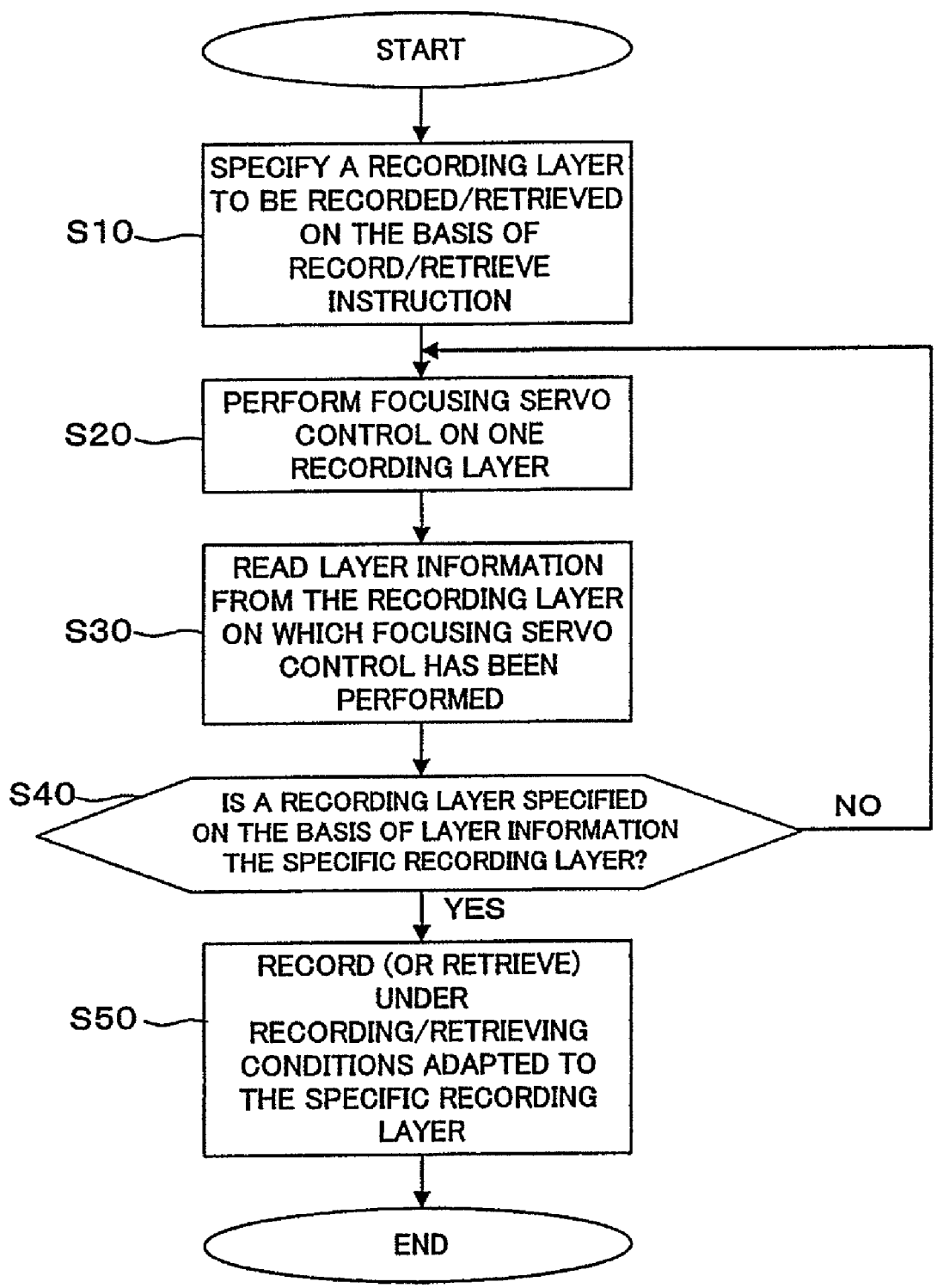
FIG. 4 is a flowchart for illustrating a process executed by a control unit of the recording/reading apparatus for the optical recording medium according to the embodiment of this invention.

In the recording/reading apparatus (drive) 60 for the optical recording medium, when a record instruction is inputted from a computer such as a personal computer or the like (or through an input unit such as a button equipped to the drive itself), the control unit 58 accesses to a contents information area included in the recording area of the medium to determine at which addresses writing is possible, as shown in FIG. 4. The control unit 58 determines on which layer the recording is to be performed, on the basis of addresses determined to be writable thereat (step S10). In the case where the control unit 58 beforehand accesses to the contents information area to read out the contents information when the medium is set in the drive, the control unit 58 may determine at which addresses information can be written, on the basis of the contents information beforehand readout.

In the case where the layer information is included in the address information, it is possible to determine on which recording layer information can be written, by detecting the layer information included in the address information. In the case where a table holding the address information and the layer information related to each other is given to the drive, it is possible to determine the layer information from the address information, using the table.

On the other hand, when a read instruction is inputted from a computer such as a personal computer or the like (or through an input unit such as a button equipped to the drive itself), the control unit 58 determines on which recording layer information is to be recorded, on the basis of address information included in the read instruction (step S10).

In this case, when the medium is set in the drive, the contents information (information showing which information is recorded at which addresses) may be read out from the medium, an icon may be displayed on the screen of the computer, for example, and the read instruction including the address information may be inputted to the drive when the user clicks the icon.

When the record instruction (or the read instruction) is inputted, the control unit 58 specifies a recording layer on which recording (or reading) is to be performed. This function of the control unit 58 is referred to as a recording layer determining unit (recording layer specifying unit).

When a record instruction (or a read instruction) is inputted, the control unit 58 instructs the focusing servo circuit 55A to perform the focusing servo control. Responsive to it, the focusing servo circuit 55A controls the optical pickup 53 through the focus driver 54 and the pickup actuator to perform the focusing servo control on either the first recording layer 2 (22) or the second recording layer 5 (25) (step S20). This function of the control unit 58 is referred to as a focusing servo control unit.

In the case where the layer information is recorded as a part of the address information on almost the entire surface of each of the recording layers 2 and 5 (22 and 25) of the optical recording medium 50, the focusing servo circuit 55A may perform the focusing servo control, with the optical pickup 53 accessing to a desired address on the basis of the address information. In the case where the layer information is recorded in the recording management area of the optical recording medium 50, the focusing servo control circuit 55A may perform the focusing servo control in this recording management area.

In the case where information is recorded on (or read from) an optical recording medium having a plurality of recording layers, the focusing servo control may be performed on any one of the plural recording layers.

Next, the control unit 58 reads out, through the preamplifier 56A, the matrix circuit 56B and the demodulating circuit 56C as being the signal processing unit 56, layer information recorded on the recording layer on which the focusing servo control has been performed (step S30). This function of the control unit 58 is referred to as a layer information reading unit.

The control unit 58 judges whether or not a recording layer specified on the basis of the layer information read out at step S30 is the recording layer specified as the recording layer to be recorded thereon or read therefrom at step S10 (step S40). This function of the control unit 58 is referred to as a recording layer judging unit.

When the control unit 58 judges, as a result of this judgment, that the recording layer specified on the basis of the layer information read out is the recording layer (specific recording layer to be recorded thereon) specified as a recording layer to be recorded thereon, the control unit 58 gives a record instruction to the optical pickup 53 through the data processing unit 57 and the recording laser driver 54Ab. Responsive to it, the laser diode is driven to record information (data) sent from, for example, a personal computer or another equipment at addresses specified on the basis of the address information of the recording layer on which the focusing servo control has been performed under recording conditions (recording/reading conditions) such as recording pulse strategy, recording power and so forth adapted to the recording layer (recording layer specified on the basis of the layer information), while the tracking control is performed through the tracking servo circuit 55B and tracking driver 54C (step S50). This function of the control unit 58 is referred to as a recording control unit (recording/reading control unit).

Meanwhile, the recording/reading conditions may be determined on the basis of recording/reading conditions beforehand recorded on the optical recording medium by reading out these, or may be determined on the basis of recording/reading conditions beforehand stored as the layer information in the recording/reading apparatus. For example, a recording recommended power or a reading recommended power may be recorded on the optical recording medium, the drive may read out it and determine the recording power or the reading power on the basis of it.

Alternatively, a recording recommended power or a reading recommended power according to layer information may be stored in the drive, a recording recommended power or a reading recommended power adapted to the layer information may be read out on the basis of it, and a recording power or a reading power may be determined on the basis of the recommended recording power or the recommended reading power read out.

According to circumstances, the OPC (Optimum Power Control) may be performed after a recording recommended power is read out, and a recording power may be determined.

When the control unit 58 judges that a recording layer specified on the basis of the read out layer information is the recording layer (specific recording layer to be read therefrom) specified as a recording layer to be read therefrom, the control unit 58 gives a read instruction to the optical pickup 53 through the reading laser driver 54Aa to read, through the signal processing unit 56, information recorded at addresses specified on the basis of the address information of the recording layer on which the focusing servo control has been performed under reading conditions (recording/reading conditions) such as reading power and so forth adapted to that recording layer (recording layer specified on the basis of the layer information), while performing the tracking control through the tracking servo circuit 55B and the tracking driver 54C (step S50). This function of the control unit is referred to as a reading control unit (recording/reading control unit).

When the control unit 58 judges that the recording layer specified on the basis of the layer information read out at step S40 is not the recording layer to be recorded thereon (or read therefrom), the control unit 58 returns to step S20, performs the focusing servo control on another recording layer, and repeats the similar process (steps S20 to S40) until the control unit 58 judges that a recording layer specified on the basis of the read out layer information is the recording layer to be recorded thereon (or read therefrom).

[Second Recording/Reading Method]

(Process at the Time of Medium Loading)

According to this embodiment, when the optical recording medium is loaded to the recording/reading apparatus (drive), recording/reading conditions such as recording pulse strategy, recording recommended power, reading recommended power, tracking polarity, and so forth recorded in relation with layer information on each of the recording layers 2 and 5 (22 and 25) on the optical recording medium 50 are read out according to an instruction from the control unit 58 (recording/reading conditions reading step, recording/reading conditions reading unit), and these recording/reading conditions are related to layer information on each of the recording layers 2 and 5 (22 and 25) and stored in the memory 58B.

For example, in the case where recording/reading conditions are recorded on only one layer [the first recording layer 2 (22)] closest to the side from which the laser beam comes in between the recording layers 2 and 5 (22 and 25) and the drive first accesses to the first recording layer 2 (22), the drive accesses to the first recording layer 2 (22) and reads out the recording/reading conditions when the medium is loaded. In this case, the tracking polarity of the first recording layer 2 (22) is beforehand determined, and the tracking polarity read out from the first recording layer 2 (22) is a tracking polarity of the second recording layer 5 (25) other than the first recording layer 2 (22). The recording/reading conditions other than the tracking polarity are recording/reading conditions of each of the recording layers 2 and 5 (22 and 25). Incidentally, when the tracking polarity of the second recording layer 5 (25) other than the first recording layer is beforehand determined, it is unnecessary to record the conditions on the first recording layer 2 (22).

According to this embodiment, information on recording/reading conditions such as recording pulse strategy, recording recommended power, reading recommended power, tracking polarity, and so forth is recorded as wobble or Land Pre-Pit, in particular. For this, this information detected by the optical pickup 53 is processed in the signal processing unit 56 such as the matrix circuit 56B, the demodulating circuit 56C, etc., and stored in the memory 58B of the control unit 58.

When information on recoding/reading conditions such as recording pulse strategy, recording recommended power, reading recommended power, tracking polarity, and so forth is recorded as ROM pits or recording pits, this information detected by the optical pickup 53 is processed in the signal processing unit such as the matrix circuit, the binary-coding circuit, the demodulating circuit, etc., and stored in the memory 58B of the control unit 58.

(Recording Method for Optical Recording Medium)

Figure 5:
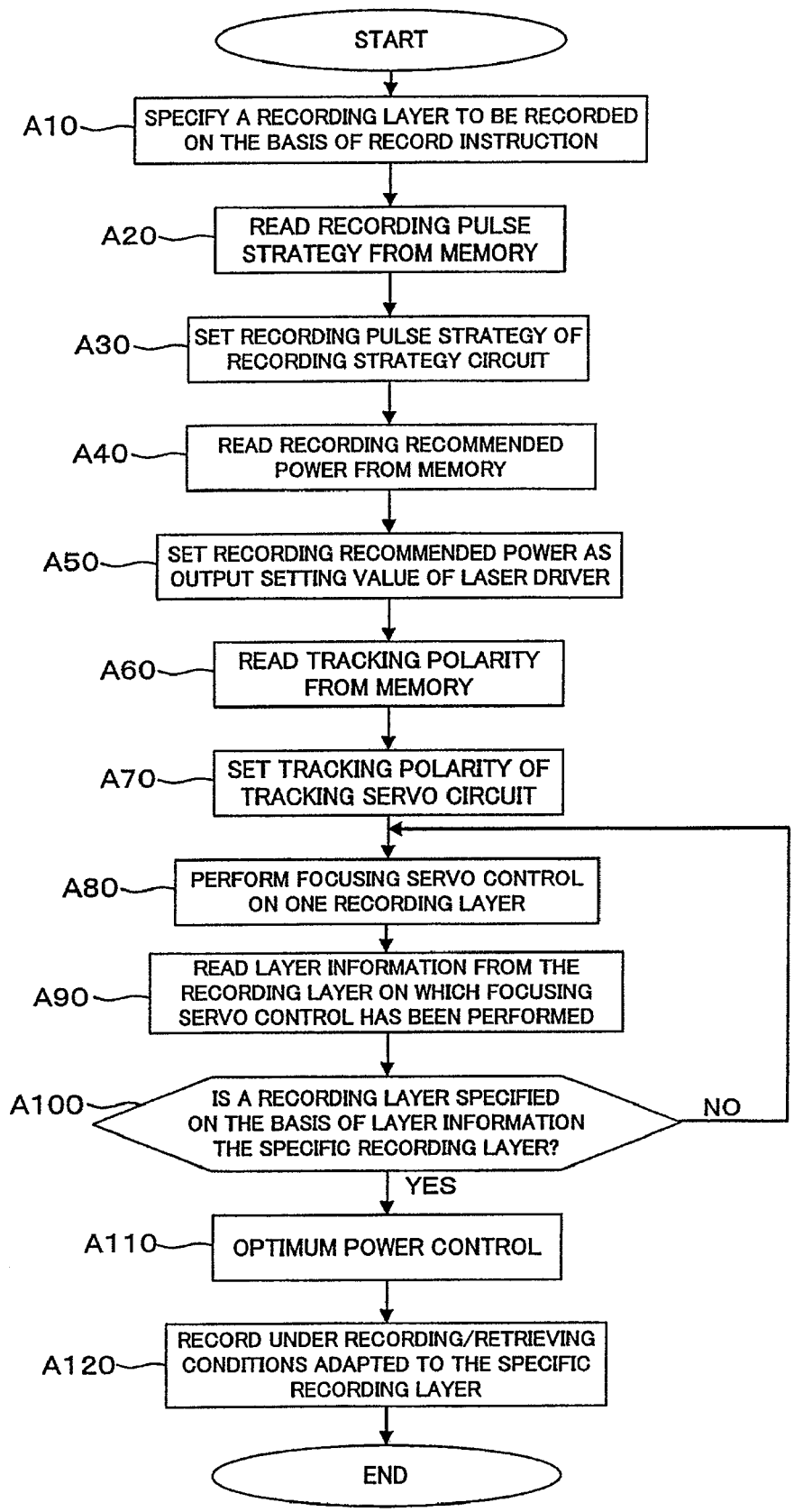
FIG. 5 is a flowchart for illustrating a recording process executed by the control unit of the recording/reading apparatus for the optical recording medium according to the embodiment of this invention.

In the recording/reading apparatus (drive) 60 for the optical recording medium, when a record instruction is inputted from a computer such as a personal computer or the like (through an input unit such as a button or the like equipped to the drive itself), the control unit 58 accesses to a contents information area included in the recording area of the medium, and determines at which addresses writing is possible, as shown in FIG. 5. The control unit 58 determines on which recording layer the recording is to be performed, on the basis of the addresses determined to be writable thereat (step A10). In the case where the control unit 58 accesses to the contents information area when the medium is set on the drive and beforehand reads the contents information, the control unit 58 may determine at which addresses writing is possible, on the basis of the contents information beforehand read out.

In the case where layer information is included in address information, the control unit 58 can determine on which recording layer recording is possible by detecting the layer information included in the address information. In the case where a table holding address information and layer information related to each other is given to the drive, the control unit 58 can determine the layer information from the address information, using the table.

When a record instruction is inputted, the control unit 58 specifies a recording layer to be recorded thereon, on the basis of the layer information, as above. This function of the control unit 58 is referred to as a recording layer determining unit (recording layer specifying unit).

Next, the control unit 58 reads out the recording pulse strategy from the memory 58B on the basis of the layer information on the recording layer specified at step A10 (step A20), and sets a recording pulse strategy of the recording strategy circuit 57B (step A30).

The control unit 58 reads out the recording recommended power from the memory 58B on the basis of the layer information on the recording layer specified at step A10 (step A40), and sets an output setting value of the recording laser driver 54Ab on the basis of the read recording recommended power (step S50).

The control unit 58 further reads out the tracking polarity from the memory 58B on the basis of the layer information on the recording layer specified at step A10 (step A60), and sets a tracking polarity of the tracking servo circuit 55B (step A70).

After the recording conditions (recording/reading conditions) are set as above, the control unit 58 gives a focusing servo control instruction to the focusing servo circuit 55A. Responsive to it, the focusing servo circuit 55A controls the optical pickup 53 through the focus driver 54B and the pickup actuator to perform the focusing servo control on either the first recording layer 2 (22) or the second recording layer 5 (25) (step A80). This function of the control unit 58 is referred to as a focusing servo control unit.

According to this embodiment, since the tracking polarity of the tracking servo circuit 55B is set to a tracking polarity adapted to a recording layer specified at step A10, the tracking servo control is performed with a tracking polarity adapted to the recording layer specified at step A10.

In the case where the layer information is recorded as a part of the address information on almost the entire surface of each of the recording layers 2 and 5 (22 and 25) of the optical recording medium 50, the focusing servo control may be performed, with the control unit 58 accessing to a desired address on the basis of the address information. In the case where the layer information is recorded in the recording management area of the optical recording medium 50, the focusing servo control may be performed in the recording management area.

In the case where information is recorded on an optical recording medium having a plurality of recording layers, the focusing servo control may be performed on any one of the plural recording layers.

Next, the control unit 58 reads out layer information recorded on the recording layer on which the focusing servo control has been performed through the preamplifier 56A, the matrix circuit 56B and the demodulating circuit 56C as being the signal processing unit 56 (step A90). This function of the control unit 58 is referred to as a layer information reading unit.

The control unit 58 judges whether a recording layer specified on the basis of the layer information read out at step A90 is the recording layer specified at step A10 (step A100).

Namely, the control unit 58 judges whether the layer information read at step A90 coincides with the layer information on the recording layer specified at step A10. This function of the control unit 58 is referred to as a recording layer judging unit (layer information judging unit).

When the control unit 58 judges as a result of the judgment that the recording layer specified on the basis of the read layer information is the recording layer specified at step A10 (specific recording layer to be recorded thereon) (that is, the control unit 58 judges that the two pieces of layer information coincide with each other), the control unit 58 performs the optimum power control (OPC) on the laser beam outputted from the laser diode through the recording laser driver 54Ab (step A110). Namely, the control unit 58 performs trial writing with various power of the laser beam in a power calibration area (PCA, trial writing area) set on the inner peripheral side (or outer peripheral side) of the recording layer on which the focusing servo control has been performed, thereby controlling the laser power to the optimum power adapted to the recording layer specified at step A10.

According to this embodiment, the output setting value of the recording laser driver 54Ab is set to a predetermined recording recommended power adapted to the recording layer, whereby the optimum power control can be quickly performed.

On the other hand, when the control unit 58 judges that the recording layer specified on the basis of the layer information read out at step A100 is not the recording layer to be recorded thereon (that is, the control unit 58 judges that the two pieces of layer information do not coincide with each other), the control unit 58 returns to step A80, performs the focusing service control on another recording layer, and repeats the similar process until the control unit 58 judges that a recording layer specified on the basis of the layer information is the recording layer to be recorded thereon (step A80 to A100).

After performing the optimum power control as above, the control unit 58 gives a record instruction to the optical pickup 53 through the data processing unit 57 and the recording laser driver 54Ab. Responsive to it, the laser diode is driven to record information (data) sent from, for example, a personal computer or another equipment at addresses specified on the basis of address information of the recording layer on which the focusing servo control has been performed under recording conditions (recording/reading conditions) adapted to the recording layer (step A120). This function of the control unit 58 is referred to as a recording controlling unit (recording/reading controlling unit).

According to this embodiment, since the recording pulse strategy (recording pulse modulation pattern) of the recording strategy circuit 57B is set to a recording pulse strategy adapted to the recording layer specified at Step A10 as state above, recording of information in a recording pulse strategy adapted to the recording layer to be recorded thereon is performed.

According to this embodiment, the power (recording power) of the laser beam outputted from the recording laser driver 54Ab is controlled to the optimum power adapted to the recording layer specified at step A10 as state above, recording of information with a laser power adapted to the recording layer to be recorded thereon is performed.

(Reading Method for Optical Recording Medium)

Figure 6:
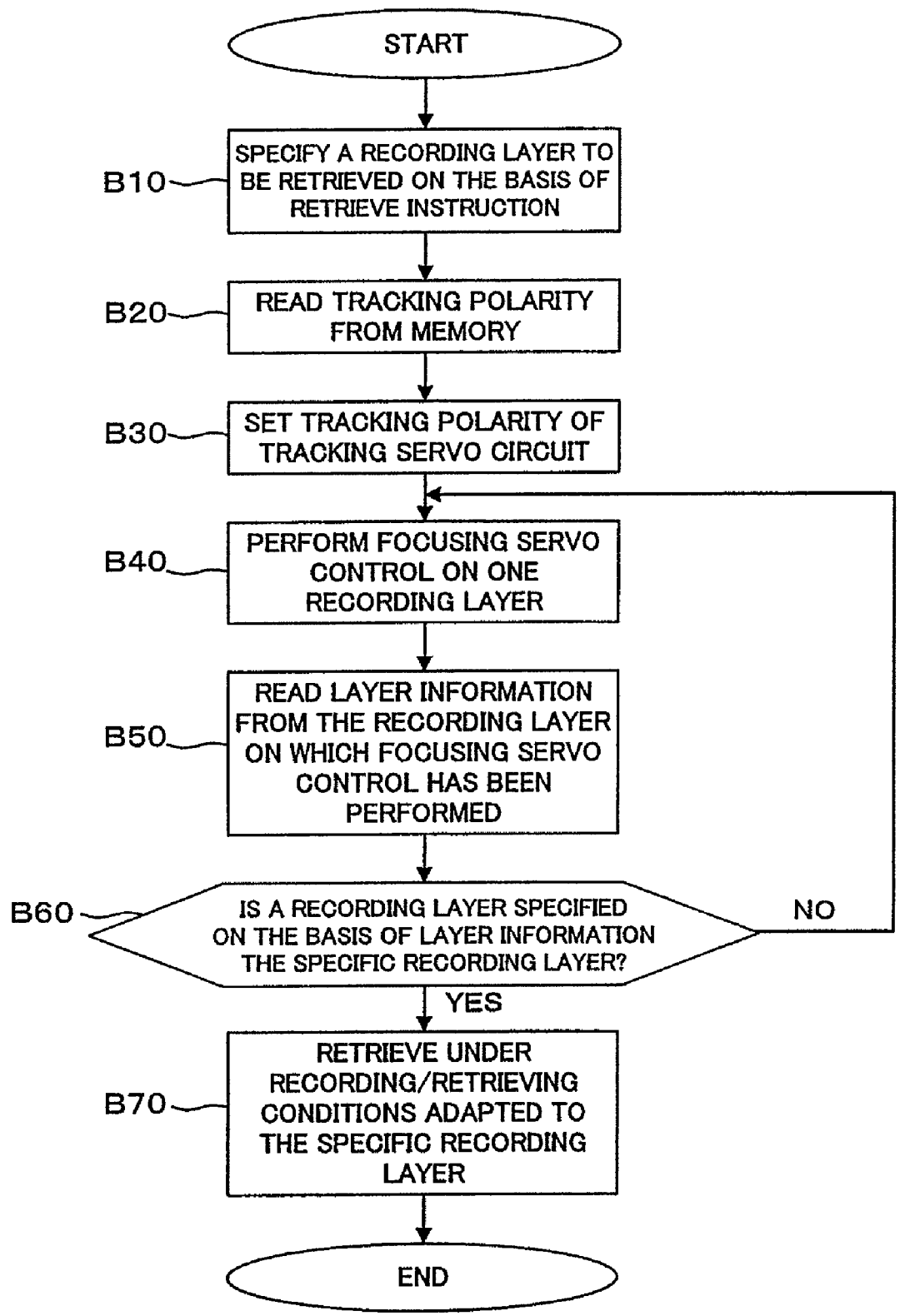
FIG. 6 is a flowchart for illustrating a reading process executed by the control unit of the recording/reading apparatus for the optical recording medium according to the embodiment of this invention.

In the recording/reading apparatus (drive) 60 for the optical recording medium, when a read instruction is inputted from a computer such as a personal computer or the like (through an input unit such as a button equipped to the drive itself), the control unit 58 determines which recording layer is to be read, on the basis address information included in the read instruction, as shown in FIG. 6 (step B10).

In this case, when a medium is set to the drive, contents information (information showing what information is recorded at which addresses) may be read out, an icon may be displayed on the screen of the computer, for example, and the read instruction including the address information may be inputted to the drive when the user clicks the icon.

When the read instruction is inputted as above, the control unit 58 specifies a recording layer to be read therefrom. This function of the control unit 58 is referred to as a recording layer determining unit (recording layer specifying unit).

Next, the control unit 58 reads out a tracking polarity from the memory 58B on the basis of layer information on the recording layer specified at step B10 (step B20), and sets the tracking polarity of the tracking servo circuit 55B (step B30).

After the reading conditions (recording/reading conditions) are set as above, the control unit 58 gives a focusing servo control instruction to the focusing servo circuit 55A. Responsive to it, the focusing servo circuit 55A controls the optical pickup 53 through the focusing driver 54B and the pickup actuator to perform the focusing servo control on either the first recording layer 2 (22) or the second recording layer 5 (25) (step B40). This function of the control unit 58 is referred to as a focusing servo control unit.

According to this embodiment, since the tracking polarity of the tracking servo circuit 55B is set to a tracking polarity adapted to a recording layer specified at step B10 as above, tracking control is performed with a tracking polarity adapted to a recording layer to be read therefrom.

In the case where layer information is recorded as a part of address information on almost the entire surface of each of the recording layers 2 and 5 (22 and 25) of the optical recording medium 50, the focusing servo control may be performed, with the control unit 58 accessing to a desired address on the basis of the address information. In the case where the layer information is recorded in the recording management area of the optical recording medium 50, the focusing servo control may be performed in this recording management area.

In the case where reading of information is performed on an optical recording medium having a plurality of recording layers, the focusing servo control may be performed on one of the plural recording layers.

Next, the control unit 58 reads out layer information recorded on the recording layer on which the focusing servo control has been performed through the preamplifier 56A, the matrix circuit 56B and the demodulating circuit 56C as being the signal processing unit 56 (step S50). This function of the control unit 58 is referred to as a layer information reading out.

The control unit 58 judges whether a recording layer specified on the basis of the layer information read out at step B50 is the recording layer specified at step B10 (step B60). Namely, the control unit 58 judges whether the layer information read out at step B50 coincides with layer information on the recording layer specified at step B10. This function of the control unit 58 is referred to as a recording layer judging unit (layer information judging unit).

When the control unit 58 judges as a result of this judgment that the recording layer specified on the basis of the read layer information is the recording layer (specific recording layer to be read therefrom) specified at step B10 (that is, the control unit 58 judges that the two pieces of layer information coincide with each other), the control unit 58 gives a read instruction to the optical pickup 53 through the reading laser driver 54Aa. Responsive to it, the laser diode is driven to read information recorded at addresses specified on the basis of address information of the recording layer on which the focusing servo control has been performed through the signal processing unit 56 under reading conditions (recording/reading conditions) adapted to the recording layer (step B70). This function of the control unit 58 is referred to as a reading control unit (recording/reading control unit).

According to this embodiment, since the power (reading power) of the laser beam outputted from the reading laser driver 54Aa is controlled to the optimum power adapted to the recording layer specified at step B10, reading of information is performed with a laser power adapted to the recording layer to be read therefrom.

When the control unit 58 judges at step B60 that the recording layer specified on the basis of the read layer information is not the recording layer to be read therefrom (that is, the control unit 58 judges that the two pieces of layer information do not coincide with each other), the control unit 58 returns to step B40, performs the focusing servo control on another recording layer, and repeats the similar process (steps B40 to B60) until the control unit 58 judges that the recording layer specified on the basis of the read layer information is the recording layer to be read therefrom (that is, the two pieces of layer information coincide with each other).

An advantage of the optical recording medium, the recording/reading method and recording/reading apparatus for the optical recording medium according to this embodiment is that the recording/reading conditions such as recording pulse strategy, recording power, reading power, and so forth can be instantaneously switched according to a recording layer to be recorded information thereon or to be read information therefrom because layer information is recorded on the optical recording medium.

It is also possible to accurately and surely perform recording or reading of information under recording/reading conditions (for example, tracking polarity, recording pulse strategy, recording power, reading power, and so forth) adapted to a recording layer on which recording or reading of information is to be performed.

Note that the present invention is not limited to the above examples, but may be modified in various ways without departing from the scope of the invention.

This application is based on Japanese Patent Application No. 2002-365542 filed on Dec. 17, 2002, Japanese Patent Application No. 2003-295988 filed on Aug. 20, 2003 and Japanese Patent Application No. 2002-365541 on Dec. 17, 2002, the whole contents of which are hereby incorporated by reference.

The invention claimed is:

1. A recording and reading method for an optical recording medium having a plurality of recording layers on which information can be recorded onto or read from, said plurality of recording layers being read from or written to, from one side of the optical recording medium by irradiating a laser beam on the one side, the method comprising the steps of:
   reading a polarity of a push-pull signal being recorded on each layer of said recording medium; and
   recording or reading information under recording or reading conditions adapted to the structure of said optical recording medium.

2. The optical recording medium used in the recording and reading method according to claim 1, wherein
   said recording or reading conditions including said polarity of said push-pull signal for each of said plurality of recording layers are recorded.

3. The optical recording medium of claim 2, wherein
   said reading and recording conditions include a pulse strategy or a recommended power for recording.

4. The optical recording medium of claim 2, wherein
   said reading and recording conditions are recorded in a recording layer of the plurality of recording layers accessed first by a drive.

5. The optical recording medium of claim 2, wherein
   said reading and recording conditions are recorded on a layer of the plurality of recording layers closest to the side onto which a laser beam is directed.

6. The optical recording medium of claim 2, wherein
   each of said plurality of recording layers is a dye containing recording layer.

7. The optical recording medium used in the recording and reading method according to claim 1,
   said recording or reading conditions including information indicating the structure of said recording medium are recorded.

8. The optical recording medium of claim 7, wherein
   said reading and recording conditions include a pulse strategy or a recommended power for recording.

9. The optical recording medium of claim 7, wherein
   said reading and recording conditions are recorded in a recording layer of the plurality of recording layers accessed first by a drive.

10. The optical recording medium of of claim 7, wherein
    said reading and recording conditions are recorded on a layer of the plurality of recording layers closest to the side onto which a laser beam is directed.

11. The optical recording medium of claim 7, wherein
    each of said plurality of recording layers is a dye containing recording layer.

12. A recording and reading apparatus for an optical recording medium having a plurality of recording layers on which information can be recorded onto or read from, said plurality of recording layers being read from or written to, from one side of the optical recording medium by irradiating a laser beam on the one side, the method comprising the steps of:
    a reading unit for reading a polarity of a push-pull signal being recorded on each layer of said recording medium; and
    a recording and reading unit for recording or reading information under recording or reading conditions adapted to the structure of said optical recording medium.

* * * * *